US012806778B2

(12) United States Patent
Isobe et al.

(10) Patent No.: US 12,806,778 B2
(45) Date of Patent: Nov. 24, 2026

(54) ROBOT SYSTEM, DEVICE FOR CONTROLLING ROBOT HAND, AND METHOD FOR CONTROLLING ROBOT HAND

(71) Applicant: Panasonic Holdings Corporation, Osaka (JP)

(72) Inventors: Yuzuka Isobe, Osaka (JP); Yoshinari Matsuyama, Osaka (JP); Takeshi Shimamoto, Hyogo (JP); Yusuke Hashimoto, Osaka (JP); Yu Kaneda, Nara (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 29 days.

(21) Appl. No.: 19/040,063

(22) Filed: Jan. 29, 2025

(65) Prior Publication Data

US 2025/0170718 A1 May 29, 2025

Related U.S. Application Data

(63) Continuation of application No. PCT/JP2023/020002, filed on May 30, 2023.

(30) Foreign Application Priority Data

Jul. 29, 2022 (JP) ................................ 2022-121852

(51) Int. Cl.
*B25J 9/16* (2006.01)

(52) U.S. Cl.
CPC .................................. *B25J 9/1664* (2013.01)

(58) Field of Classification Search
CPC ......... B25J 9/1664; B25J 9/1612; B25J 15/08
See application file for complete search history.

(56) References Cited

U.S. PATENT DOCUMENTS

2009/0025502 A1* 1/2009 Nakamoto ........... B25J 15/0009 901/31
2014/0028040 A1* 1/2014 Oda ....................... B25J 19/021 294/115

(Continued)

FOREIGN PATENT DOCUMENTS

JP 2021-171019 9/2012
JP 2018-43331 3/2018

(Continued)

OTHER PUBLICATIONS

A Recursive Algorithm for the Forward Kinematic Analysis of Robotic Systems Using Euler Angles (Year: 2022).*

(Continued)

*Primary Examiner* — Adam R Mott
*Assistant Examiner* — Sagar Kc
(74) *Attorney, Agent, or Firm* — Wenderoth, Lind & Ponack, L.L.P.

(57) ABSTRACT

A robot system includes a robot hand that includes finger portions, belts on the finger portions, a motor for driving the belts, and a control device configured to control the robot hand. The robot hand is configured to rotate a target object about a first axis on a three-dimensional coordinate axis and a second axis which is different from the first axis by driving the belts in a state of gripping the target object. The control device is configured to cause the target object to transition to a target posture rotated about a third axis orthogonal to each of the first axis and the second axis by combining the rotation about the first axis and the rotation about the second axis.

16 Claims, 21 Drawing Sheets

(56) References Cited

U.S. PATENT DOCUMENTS

| | | | | |
|---|---|---|---|---|
| 2018/0169870 | A1* | 6/2018 | Nakayama | B25J 15/106 |
| 2020/0258262 | A1* | 8/2020 | Lasserre | G06F 17/16 |
| 2021/0146549 | A1* | 5/2021 | Shih | B25J 9/163 |

FOREIGN PATENT DOCUMENTS

| | | | | |
|---|---|---|---|---|
| JP | 2018043331 | A | * | 3/2018 |
| WO | 2017/154254 | | | 9/2017 |
| WO | 2021/141024 | | | 7/2021 |

OTHER PUBLICATIONS

International Search Report issued Jul. 18, 2023 in International (PCT) Application No. PCT/JP2023/020002.

* cited by examiner

ROBOT SYSTEM, DEVICE FOR CONTROLLING ROBOT HAND, AND METHOD FOR CONTROLLING ROBOT HAND

TECHNICAL FIELD

The present disclosure relates to a robot system, a device for controlling a robot hand, and a method for controlling a robot hand.

BACKGROUND ART

In the related art, in order to perform various works on behalf of a human, a device including a robot hand imitating a human hand has been widely used. It is required that the human hand can perform a delicate motion such as gripping of an object and a robot hand also realizes a motion equivalent to the motion by the human hand. For example, WO 2017/154254 discloses a configuration in which a posture of a gripped target object can be changed in a state where the gripped target object is gripped by a robot hand including a plurality of finger portions.

SUMMARY OF THE INVENTION

The present disclosure has been made in view of the above-described circumstances of the related art, and an object of the present disclosure is to provide a robot system, a device for controlling a robot hand, and a method for controlling a robot hand capable of changing a posture of a target object in a state where the target object is gripped with a simple configuration.

A robot system according to the present disclosure includes a robot hand that includes a plurality of finger portions, a plurality of belts provided on the plurality of finger portions, and a motor for driving the plurality of belts, and a control device that controls the robot hand. The robot hand is configured to rotate a target object about a first axis on a three-dimensional coordinate axis and about a second axis different from the first axis by driving the plurality of belts in a state of gripping the target object. The control device causes the target object to transition to a target posture rotated about a third axis orthogonal to each of the first axis and the second axis by combining the rotation about the first axis and the rotation about the second axis in a case where the target object gripped by the robot hand is in the target posture.

In addition, a device for controlling a robot according to the present disclosure is a device for controlling a robot hand that includes a plurality of finger portions, a plurality of belts provided on the plurality of finger portions, and a motor for driving the plurality of belts. The robot hand is configured to rotate a target object about a first axis on a three-dimensional coordinate axis and about a second axis different from the first axis by driving the plurality of belts in a state of gripping the target object. The control device causes the target object to transition to a target posture rotated about a third axis orthogonal to each of the first axis and the second axis by combining the rotation about the first axis and the rotation about the second axis in a case where the target object gripped by the robot hand is in the target posture.

In addition, a method for controlling a robot hand according to the present disclosure is a method for controlling a robot hand that includes a plurality of finger portions, a plurality of belts provided on the plurality of finger portions, and a motor for driving the plurality of belts. The control method includes rotating, by the robot hand, a target object about a first axis on a three-dimensional coordinate axis and about a second axis different from the first axis by driving the plurality of belts in a state of gripping the target object. The control method includes causing, by a processor in cooperation with a memory, the target object to transition to a target posture rotated about a third axis orthogonal to each of the first axis and the second axis by combining the rotation about the first axis and the rotation about the second axis in a case where the target object gripped by the robot hand is in the target posture.

Note that, conversions among a method, an apparatus, a system, a storage medium, a computer program, and the like of any combinations of the elements described above and the expressions used in the present disclosure are also valid as aspects of the present disclosure.

According to the present disclosure, it is possible to provide the robot system capable of changing the posture of the target object in a state where the target object is gripped with a simple configuration.

DESCRIPTION OF EMBODIMENT

Background of Present Disclosure

In the related art, for the purpose of reducing a work load, a remote operation, or the like, it is required to perform various works using a system including a robot hand instead of a human hand. The human hand can perform a delicate motion such as gripping a target object using a finger, a palm, or the like and changing a posture of the target object in the grasped state. For example, WO 2017/154254 discloses a configuration in which a robot hand includes a plurality of finger portions and a rotary member is installed at each finger portion in order to change a posture of a target object gripped by the robot hand. In WO 2017/154254, for example, the configuration for changing the posture of the target object is complicated such as a plurality of joints of the finger portion. Thus, it is required to finely adjust the posture of the gripped target object with a simpler configuration. Hereinafter, an exemplary embodiment specifically disclosing a robot system, a control device of a robot hand, and a control method of a robot hand according to the present disclosure will be described in detail with appropriate reference to the accompanying drawings. It is noted that a more detailed description than need may be omitted. For example, detailed descriptions of a well-known matter or redundant descriptions of substantially the same structures may be omitted. This is to avoid the unnecessary redundancy in the following descriptions and to make the descriptions easier to understand for those skilled in the art. Note that the accompanying drawings and the following descriptions are provided for those skilled in the art to fully understand the present disclosure, and are not intended to limit the subject matter described in the claims.

First Exemplary Embodiment

[System Configuration]

Figure 1:
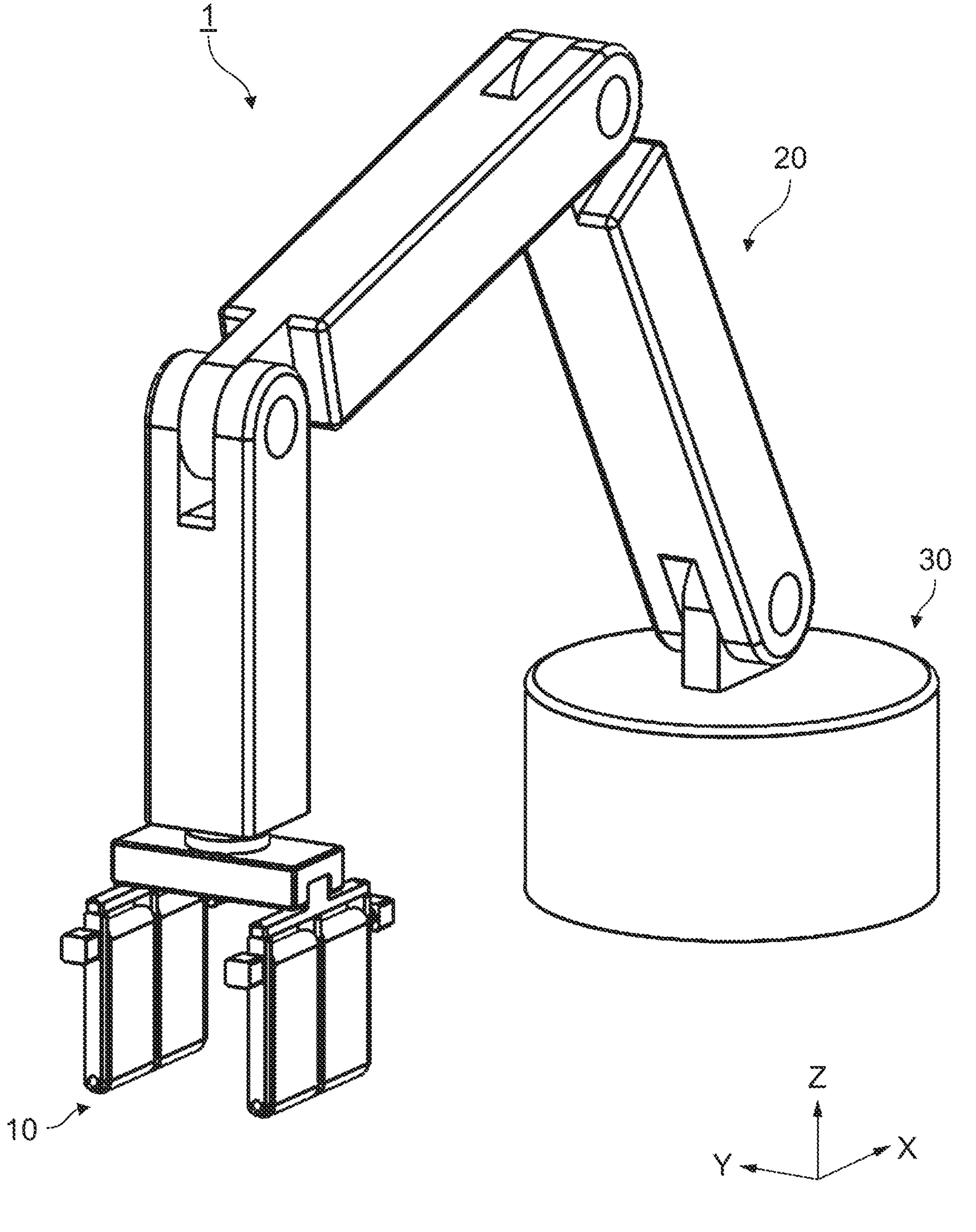
FIG. 1 is an external perspective view of a robot according to a first exemplary embodiment.

FIG. 1 is an external perspective view illustrating a configuration example about robot 1 included in a robot system according to a first exemplary embodiment. Robot 1 includes robot hand 10, robot arm 20, and base 30. Robot hand 10 is a portion for gripping a target object, and details of robot hand 10 will be described later with reference to FIG. 3 and the like. Robot arm 20 is an articulated (multi-axis) robot arm including a plurality of joints, and robot hand 10 is installed at a distal end portion thereof. In the example of FIG. 1, robot arm 20 has an example of an articulated configuration having a rotation axis at a connection unit with robot hand 10 and the other three rotation axes, but is not limited thereto. In addition, an orientation of the rotation axis may be another configuration. Base 30 is connected to robot arm 20 and is installed at any location. Base 30 may be configured to rotate robot arm 20 about a Z-axis illustrated in the drawing.

In addition, although not illustrated in FIG. 1, base 30 may be installed on a mechanism movable on an XY plane such as a slider, or base 30 may be installed on a wall surface or the like. In addition, a shape of robot arm 20, a shape of base 30, and the like are not particularly limited, and can be voluntarily changed.

In the drawings to be described below, a correspondence relationship in a three-dimensional space is indicated by three-dimensional coordinate axes including an X-axis, a Y-axis, and a Z-axis. Although orientations of the three-dimensional coordinate axes used herein are an example, in the drawings, the orientations of the axes are described as corresponding orientations.

Figure 2:
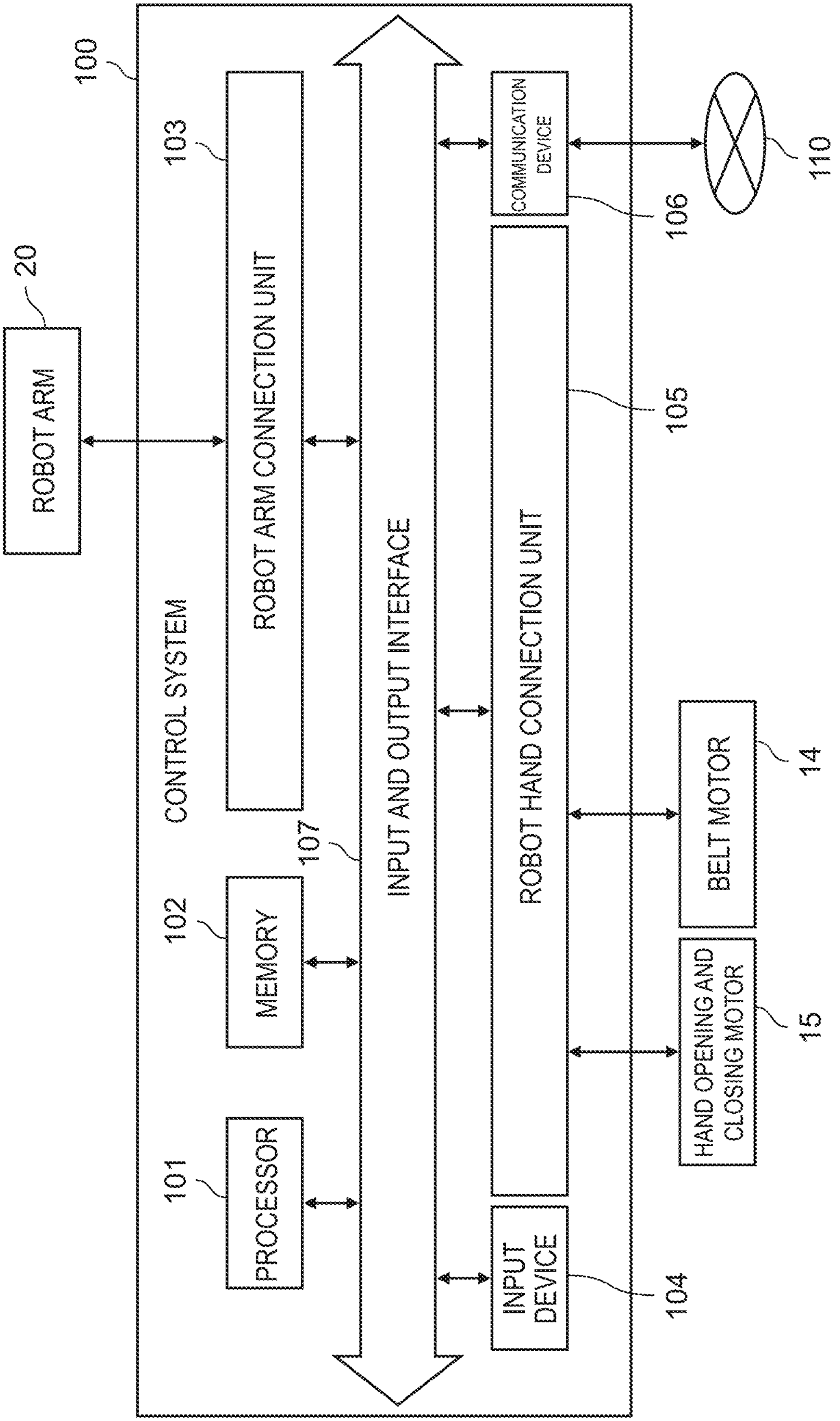
FIG. 2 is a block diagram illustrating an example of an overall configuration of a robot system according to the first exemplary embodiment.

FIG. 2 illustrates a configuration example of control system 100 for controlling robot 1 according to the first exemplary embodiment. Control system 100 functions as a control device for controlling an operation of robot 1 illustrated in FIG. 1. Control system 100 includes processor 101, memory 102, robot arm connection unit 103, input device 104, robot hand connection unit 105, and communication device 106, and these components are connected to communicate via an input and output interface 107.

Processor 101 may include a central processing unit (CPU), a micro processing unit (MPU), a digital signal processor (DSP), a graphical processing unit (GPU), a field programmable gate array (FPGA), and the like. Memory 102 is a storage region for storing therein and retaining various types of data, and includes, for example, a read-only memory (ROM) that is a nonvolatile storage region, a random access memory (RAM) that is a volatile storage region, and a hard disk drive (HDD). For example, processor 101 reads and executes various types of data and programs stored in memory 102, and thus, various controls to be described later are realized.

Robot arm connection unit 103 is an interface for connection with robot arm 20, and transmits and receives various control signals to and from robot arm 20 based on an instruction from processor 101. Input device 104 receives, for example, data of an instruction by a user from a mouse or a keyboard (not illustrated). Input device 104 may further include an output unit for outputting data of various types of information by a display (not illustrated) or the like. Robot hand connection unit 105 is an interface for connection with robot hand 10, and transmits and receives various control signals to and from robot hand 10 based on an instruction from processor 101. As will be described in detail later, robot hand 10 includes hand opening and closing motor 15 that opens or closes finger portion 12 and belt motor 14 provided in finger portion 12. Robot hand connection unit 105 transmits and receives various control signals for these controls. Note that, in the present example, robot arm connection unit 103 and robot hand connection unit 105 are illustrated separately, but these connection units may be integrated.

Communication device 106 communicates with an external device (not illustrated) via network 110 such as a wired or wireless network, and transmits and receives various types of data and signals. A communication method used by communication device 106 is not particularly limited, and the communication device may support a plurality of communication methods. For example, a wide area network (WAN), a local area network (LAN), power line communication, or near-field communication (for example, Bluetooth (registered trademark)) may be used. Input and output interface 107 may include, for example, an internal bus or the like.

Note that, control system 100 illustrated in FIG. 2 may be partially included in base 30 illustrated in FIG. 1, or may have a configuration in which control system 100 and base 30 (and robot arm 20 and robot hand 10) are connected via network 110.

[Robot Hand]

A configuration example of robot hand 10 according to the present exemplary embodiment will be described with reference to FIG. 3 and the like. In the following description, in a case where it is necessary to individually describe components of the same type, reference signs will be given with subscripts (a, b, . . . ). On the other hand, in a case where the components of the same type can be described in common, the subscripts are omitted.

Figure 3:
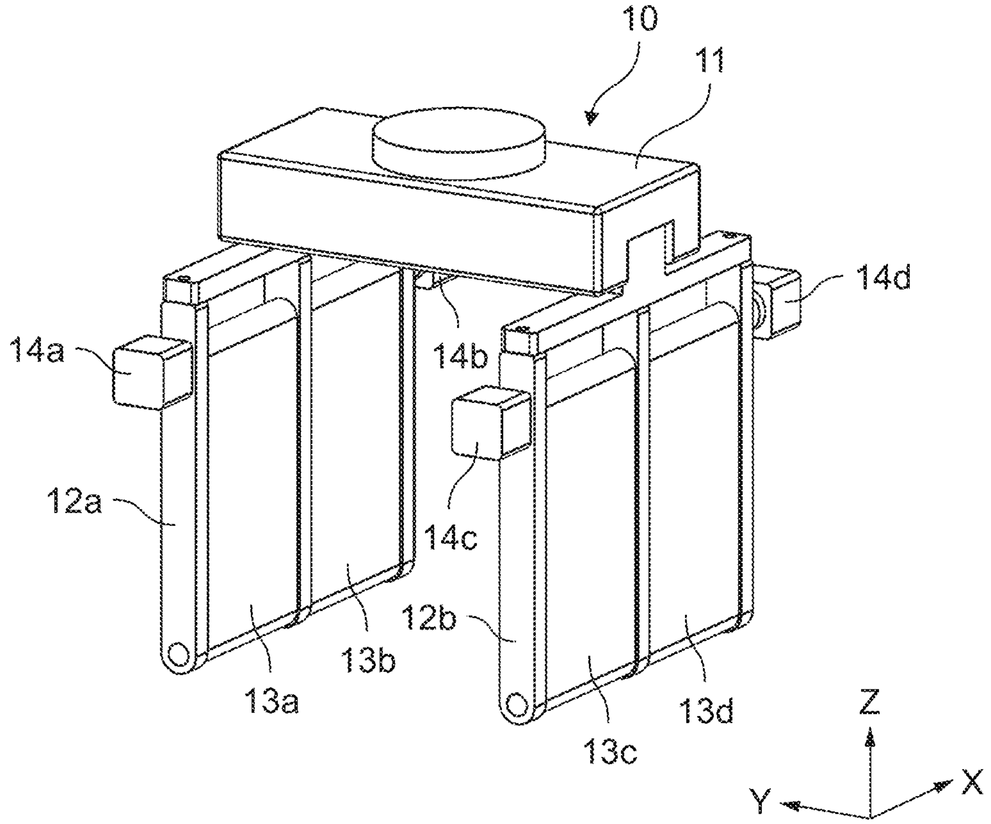
FIG. 3 is an external perspective view illustrating a configuration example of a robot hand according to the first exemplary embodiment.

FIG. 3 is an external perspective view of robot hand 10 according to the present exemplary embodiment. Robot hand 10 includes coupling portion 11 and a plurality of finger portions 12. Coupling portion 11 is a portion for coupling robot hand 10 and robot arm 20. Hand opening and closing motor 15 is provided in coupling portion 11 to control the opening or closing of each of the plurality of finger portions 12. The plurality of finger portions 12 are opened and closed by sliding in a Y-axis direction, but may be configured to be opened to a state where surfaces of belts 13 are horizontal on the XY plane. Note that, a force sensor (not illustrated), an imaging unit for determining a posture of the gripped target object, and the like may be further provided, and the opening or closing of the plurality of finger portions 12 may be controlled based on detection results by the force sensor and the imaging unit. A shape of coupling portion 11 as viewed along a Z-axis direction is not limited to a rectangle, and may be, for example, a square.

In the configuration example of FIG. 3, two finger portions 12*a* and 12*b* (first finger portion and second finger portion) are provided. Finger portion 12*a* includes two endless annular belts 13*a* and 13*b* (first belt and second belt) and belt motors 14*a* and 14*b* corresponding thereto. Belts 13*a* and 13*b* are operable independently by belt motors 14*a* and 14*b*, respectively. Similarly, finger portion 12*b* also includes two endless annular belts 13*c* and 13*d* (third belt and fourth belt) and belt motors 14*c* and 14*d* corresponding thereto.

Figure 4:
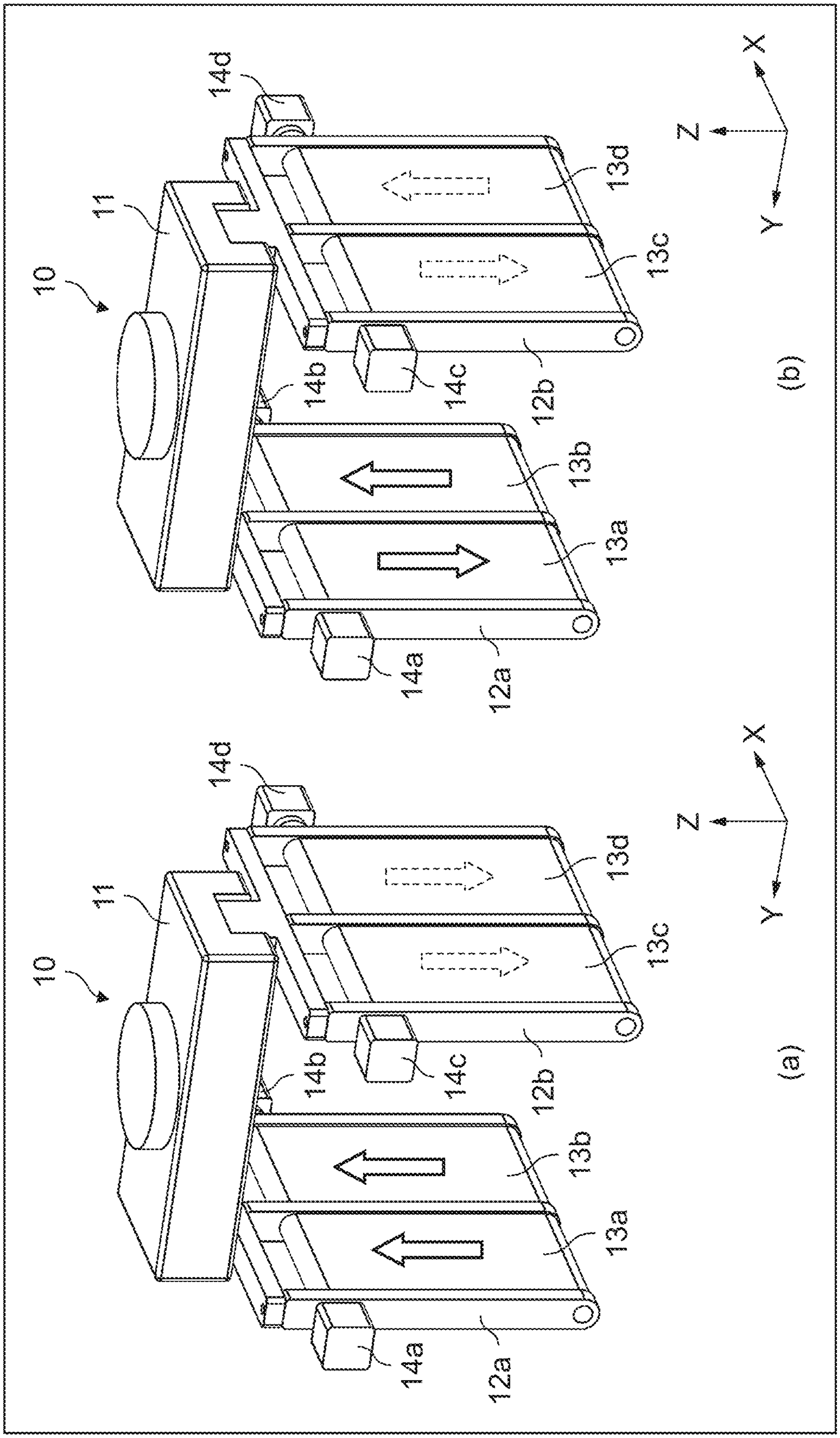
FIG. 4 is an external perspective view for explaining movement of the robot hand according to the first exemplary embodiment.

FIG. 4 is an external perspective view for explaining movement of robot hand 10 according to the present exemplary embodiment. Here, FIG. 4 indicates a state where two finger portions 12*a* and 12*b* are opened by hand opening and closing motor 15. Two finger portions 12*a* and 12*b* slide in the Y-axis direction to reduce a distance, and thus, two finger portions enter a closed state. As a result, two finger portions can grip the target object. Arrows illustrated in FIG. 4 indicate moving directions of belts 13 inside robot hand 10 gripping the target object (contact side with the target object). Note that, in an external perspective view or the like to be used in the following description, an arrow indicating a moving direction of a surface hidden from a viewpoint position is indicated by a broken line, and an arrow indicating a moving direction of a surface not hidden from the viewpoint position is indicated by a solid line. In (a) of FIG. 4, two belts 13*a* and 13*b* of finger portion 12*a* are counterclockwise about an X-axis direction by operations of belt motors 14*a* and 14*b*, respectively. In addition, two belts 13*c* and 13*d* of finger portion 12*b* are counterclockwise about the X-axis direction by operations of belt motors 14*c* and 14*d*, respectively. That is, control system 100 drives belts 13*a* and 13*b* in a +Z-axis direction (first direction) and drives belts 13*c* and 13*d* in a-Z-axis direction (second direction). As a result, control system 100 can rotate the target object about an X-axis as illustrated in (b) of FIG. 7. Here, an example in which moving speeds of belts 13*a* to 13*d*, that is, rotation speeds of belt motors 14 are the same is illustrated, but the belts are operable at different rotation speeds. Note that, in the following description, a length of an arrow illustrated in the drawings indicates a speed, and the same length indicates the same speed.

In (b) of FIG. 4, belt 13*a* of finger portion 12*a* is clockwise about the X-axis direction by the operation of belt motor 14*a*, and belt 13*b* of finger portion 12*a* is counterclockwise about the X-axis direction by the operation of belt motor 14*b*. In addition, belt 13*c* of finger portion 12*b* is counterclockwise about the X-axis direction by the operation of belt motor 14*c*, and belt 13*d* of finger portion 12*b* is clockwise about the X-axis direction by the operation of belt motor 14*d*. That is, control system 100 drives belts 13*b* and 13*d* in the +Z-axis direction (first direction) and drives belts 13*a* and 13*c* in the −Z-axis direction (second direction). As a result, control system 100 can rotate the target object about the Y-axis as illustrated in (c) of FIG. 7. Here, an example in which the moving speeds of belts 13, that is, the rotation speeds of belt motors 14 are the same is illustrated, but the belts are operable at different speeds.

[Combination of Rotation Controls]

While the robot hand having the configuration according to the present exemplary embodiment described above realizes a simple configuration, there is a restriction that the posture of the target object about a predetermined axis cannot be directly changed in a state where the target object is gripped. For example, in the case of the configuration example of robot hand 10 illustrated in FIG. 3, the gripped target object can be rotated about the X-axis (that is, the posture cab be changed) by operating the robot hand as illustrated in (a) of FIG. 4. In addition, the gripped target object can be rotated about the Y-axis by operating the robot hand as illustrated in (b) of FIG. 4. However, direct rotation about the Z-axis cannot be performed.

Therefore, in the present exemplary embodiment, rotation controls about axes capable of changing the posture are combined, and thus, direct change of the posture about a predetermined axis not capable of directly changing the posture is realized. Here, in the three-dimensional coordinate axes, due to a structure of the robot hand, axes about which the gripped target object is rotatable in the three-dimensional coordinate axes are also referred to as a first axis and a second axis, and an axis about which the gripped target object is not directly rotatable is also referred to as a third axis. In the configuration example of robot hand 10 illustrated in FIG. 4, the X-axis and the Y-axis correspond to the first axis and the second axis, respectively, and the Z-axis corresponds to the third axis. Note that, the above correspondence relationship is an example, and can vary depending on the configuration of the robot hand and the setting of the coordinate axes.

In the combination of the rotation controls according to the present exemplary embodiment, the rotation controls about the first axis and the second axis are sequentially performed so as to correspond to the rotation about the third axis. In the present exemplary embodiment, the rotation controls about the first axis and the second axis are used in a pattern. More specifically, a first rotation control about the first axis, a second rotation control about the second axis, and a third rotation control about the first axis are sequentially performed.

Here, rotation angles of the first to third rotation controls are $\varphi$, $\theta$, and $\psi$, respectively. Rotation angles $\varphi$, $\theta$, and $\psi$ can be defined as follows with respect to rotation target angle $\alpha$ about the third axis.

When $-\pi \le \alpha \le \pi$ $$(\varphi, \theta, \Psi) = (\pi/2, -\alpha, -\pi/2) \quad (1)$$

$$(\varphi, \theta, \Psi) = (-\pi/2, \alpha, \pi/2) \quad (2)$$

In particular, when α=−π and π

$$(\varphi, \theta, \Psi) = (0, \pi, \pi) \quad (3)$$

$$(\varphi, \theta, \Psi) = (0, -\pi, \pi) \quad (4)$$

$$(\varphi, \theta, \Psi) = (0, \pi, -\pi) \quad (5)$$

$$(\varphi, \theta, \Psi) = (0, -\pi, -\pi) \quad (6)$$

$$(\varphi, \theta, \Psi) = (\pi, \pi, 0) \quad (7)$$

$$(\varphi, \theta, \Psi) = (\pi, -\pi, 0) \quad (8)$$

$$(\varphi, \theta, \Psi) = (-\pi, \pi, 0) \quad (9)$$

$$(\varphi, \theta, \Psi) = (-\pi, -\pi, 0) \quad (10)$$

The first to third rotation controls are executed according to the definitions of combinations of the above 10 parameters to correspond to rotation target angle α about the third axis, and thus, it is possible to change the posture about the third axis. In the following control example, the description will be made by using a combination of one parameter among the above definitions, but the same final posture can be obtained as a result by performing control by using a combination of other parameters.

[Control Processing]

Figure 5:
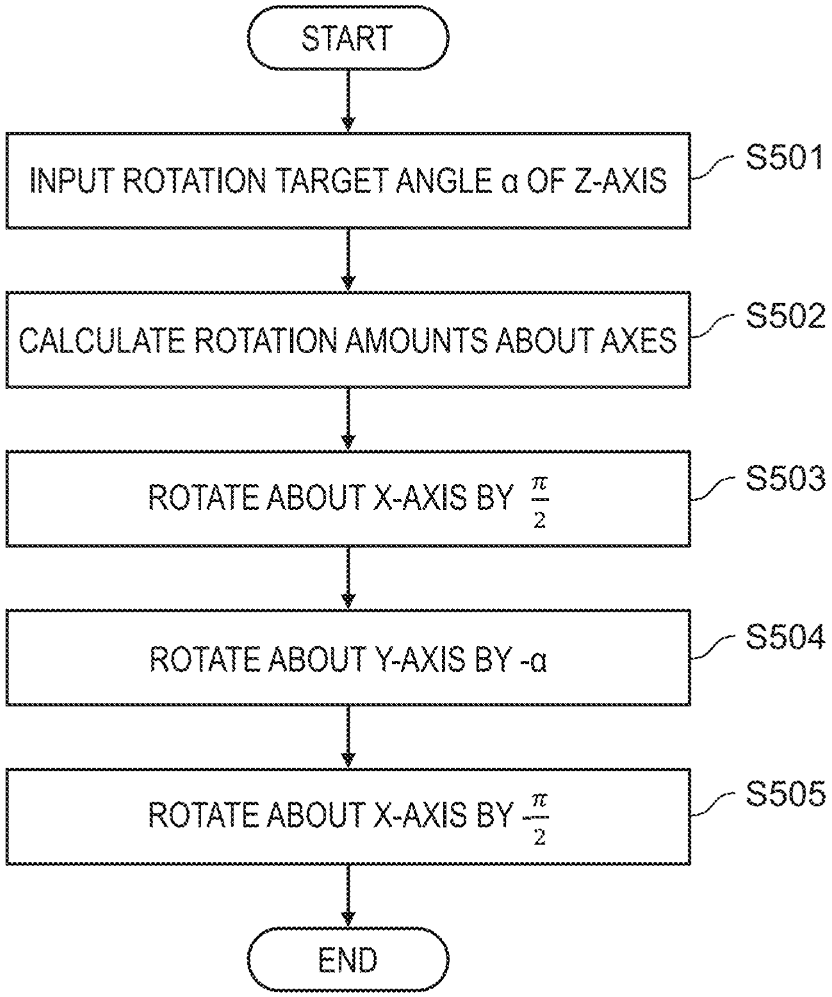
FIG. 5 is a flowchart of control processing of the robot hand according to the first exemplary embodiment.

FIG. 5 is a flowchart of control processing of the robot hand according to the present exemplary embodiment. Each process in the flowchart is realized by control system 100 controlling robot hand 10. Note that, it is assumed that control system 100 controls robot 1 before this control processing is performed such that the target object is gripped by robot hand 10. In addition, the control related to the change in the posture about the Z-axis in which robot hand 10 cannot directly change the posture of the target object will be described as an example.

Here, an example using a combination of parameters corresponding to Pattern (1) among the above definitions will be described.

In step S501, control system 100 inputs rotation target angle α about the Z-axis of the target object gripped by robot hand 10. Note that, rotation target angle α may be indicated by an absolute rotation angle that is a rotation angle from a reference position defined in advance, or may be indicated by any of relative rotation angles based on a position in a current posture. Rotation target angle α may be input based on, for example, a parameter designated by the user via input device 104 or the like, or may be input based on a parameter defined based on a work to be executed by the robot system. In addition, clockwise along the arrow of each axis illustrated in each drawing is a positive (+) direction, and counterclockwise is a negative (−) direction.

In step S502, control system 100 calculates rotation amounts about the X-axis and the Y-axis with respect to the gripped target object based on rotation target angle α designated in step S501. That is, control amounts corresponding to rotation angles q, 0, and Y of the first to third rotation controls are derived. Movement amounts of belts 13 corresponding to the rotation amounts about the X-axis and the Y-axis used herein, that is, rotation amounts and rotation speeds of belt motors 14 may be defined in advance in accordance with a size of the gripped target object, degrees of opening and closing of the plurality of finger portions 12 by hand opening and closing motor 15, and the like.

In step S503, control system 100 rotates the gripped target object about the X-axis by a rotation angle of π/2 (that is, rotation angle φ), as the first rotation control. The operation of finger portions 12 of robot hand 10 in this process is as illustrated in (a) of FIG. 4. Note that, since (a) of FIG. 4 illustrates an example of a case where the rotation about the X-axis in the positive direction is performed, in the case of the rotation in the negative direction, orientations of arrows indicating directions in which belts 13 are moved are all reversed.

In step S504, control system 100 rotates the gripped target object by a rotation angle of −α (that is, rotation angle θ) about the Y-axis, as the second rotation control. The operation of finger portions 12 of robot hand 10 in this process is as illustrated in (b) of FIG. 4. Note that, since (b) of FIG. 4 illustrates an example of a case where the rotation about the Y-axis in the negative direction is performed, in the case of the rotation in the positive direction, orientations of arrows indicating directions in which belts 13 are moved are all reversed.

In step S505, control system 100 rotates the gripped target object about the X-axis by a rotation angle of −π/2 (that is, rotation angle ψ), as the third rotation control. The operation of finger portions 12 of robot hand 10 in this process is a reverse rotation in (a) of FIG. 4. This flowchart is ended.

(Control Example)

Through the above series of control, robot hand 10 can change the posture of the gripped target object about the Z-axis. Specific examples will be described with reference to FIGS. 6 and 7. Here, a case where dice 600 is used as an example of the target object to be gripped will be described.

Figure 6:
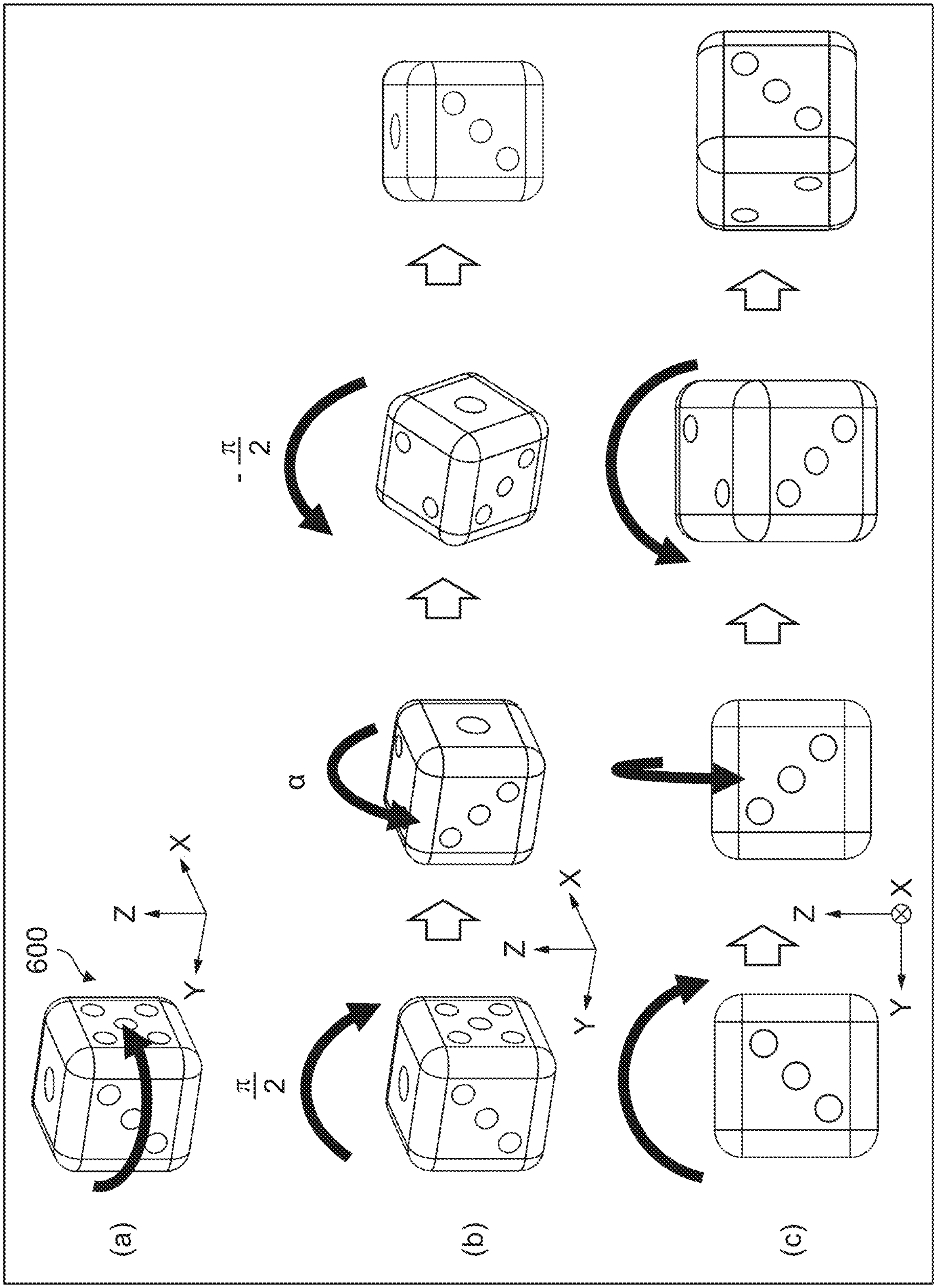
FIG. 6 is a diagram for explaining a change in posture of dice by the robot hand.

As illustrated in (a) of FIG. 6, dice 600 is rotated about the Z-axis by rotation target angle α, and this posture is set as a target posture. (b) of FIG. 6 is a perspective view of a transition of a posture of dice 600, and (c) of FIG. 6 is a front view of a transition of the posture of dice 600 along the X-axis. Accordingly, the transitions of the posture of dice 600 in (b) of FIG. 6 and (c) of FIG. 6 are the same, and correspond to the states of steps S503 to S505 of FIG. 5 in order from the left in the drawing, and a rightmost side indicates a final posture of dice 600, that is, the target posture.

Figure 7:
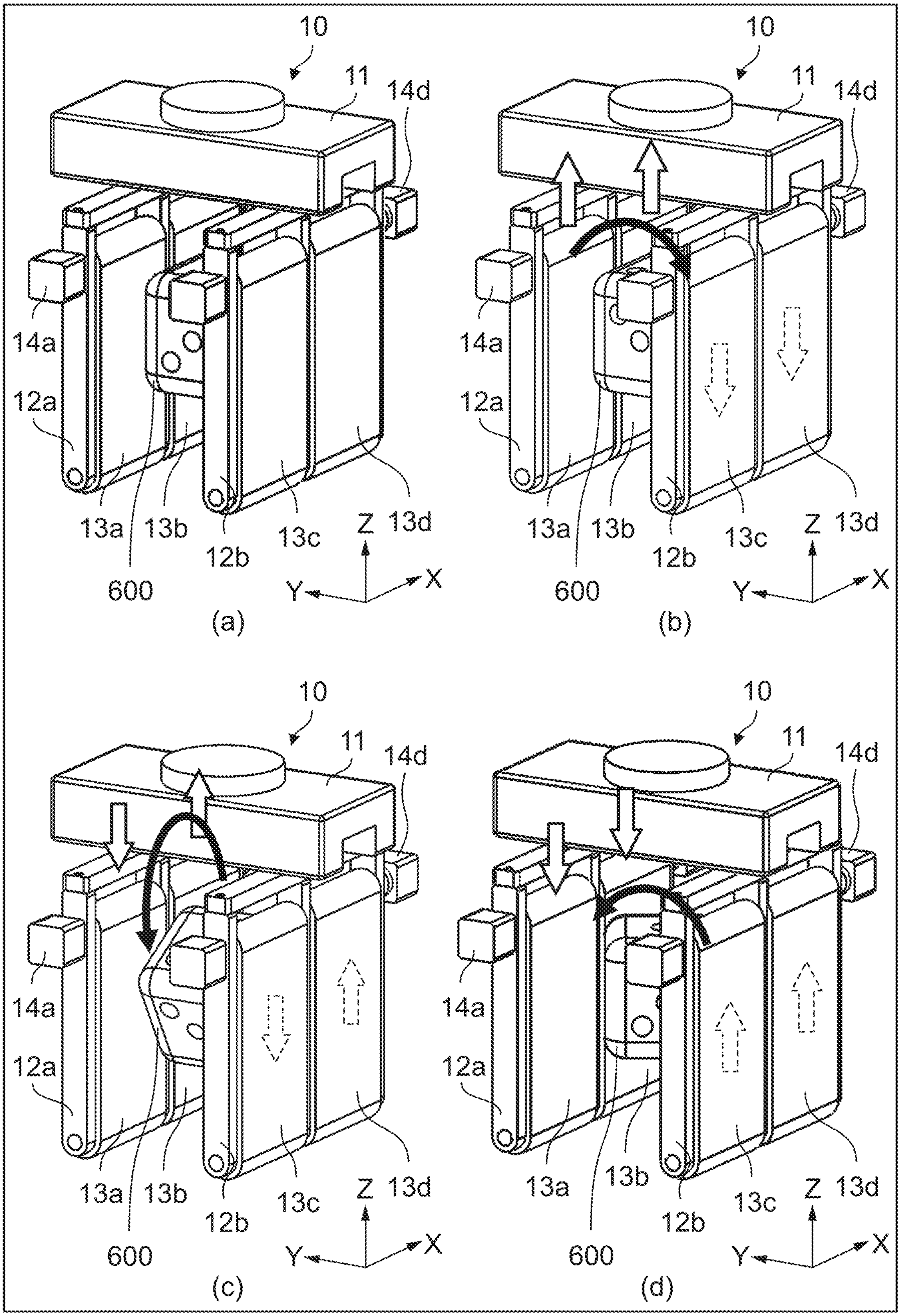
FIG. 7 is a diagram for explaining the change in posture of the dice by the robot hand.

FIG. 7 is an external perspective view illustrating a transition when the posture of dice 600 is changed by rotation target angle α about the Z-axis by the processing flow illustrated in FIG. 5 in robot hand 10 having the configuration illustrated in FIG. 4. The state transition of dice 600 is as illustrated in FIG. 6. In addition, in FIG. 7, white arrows and broken line arrows indicate the moving directions of belts 13 on contact surfaces between dice 600 and belts 13 of each finger portion 12.

(a) of FIG. 7 illustrates a state at a start point in time of the processing flow of FIG. 5. (b) of FIG. 7 illustrates a state where the process (first rotation control) of step S503 in FIG. 5 is performed, and the rotation in the positive direction about the X-axis is performed. (c) of FIG. 7 illustrates a state where the process (second rotation control) of step S504 in FIG. 5 is performed, and the negative rotation about the Y-axis is performed. (d) of FIG. 7 illustrates a state where the process (third rotation control) of step S505 in FIG. 5 is performed, and the negative rotation about the X-axis is performed. As a result, dice 600 takes the rightmost posture in (b) of FIG. 6 and (c) of FIG. 6, that is, the target posture.

(Modification 1)

Figure 8:
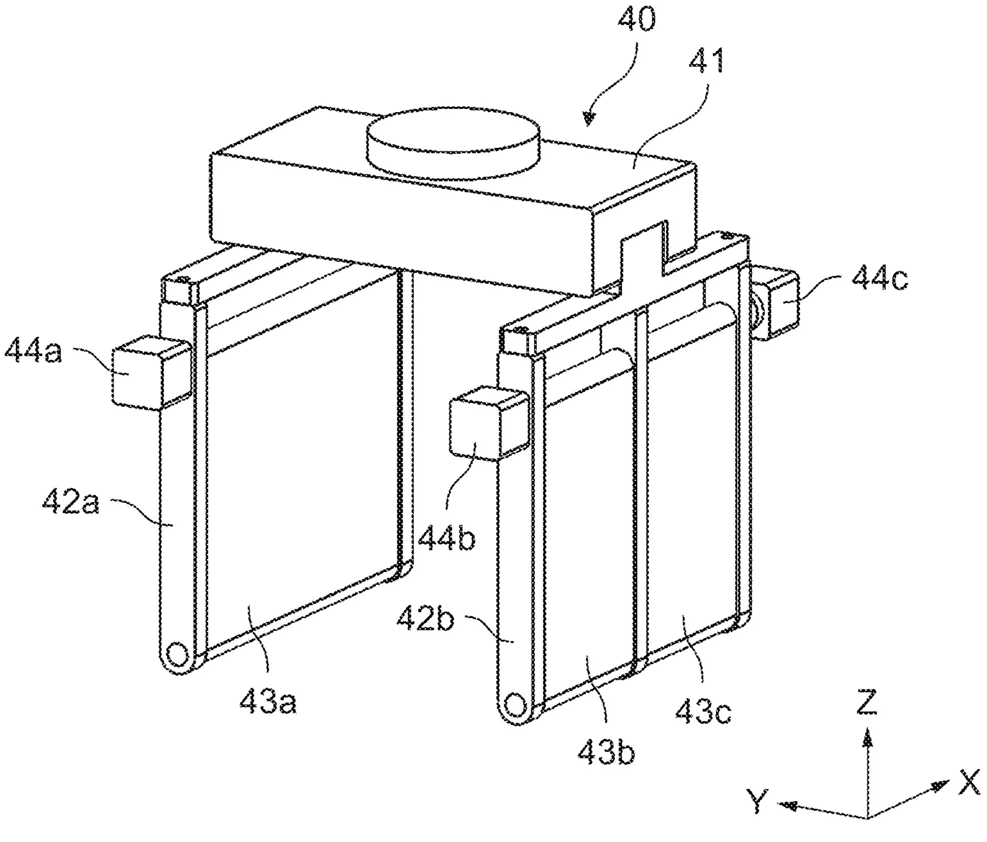
FIG. 8 is an external perspective view illustrating Modification 1 of the robot hand according to the first exemplary embodiment.

FIG. 8 is an external perspective view of robot hand 40 which is Modification 1 of the robot hand according to the present exemplary embodiment. Robot hand 40 includes coupling portion 41 and a plurality of finger portions 42. Coupling portion 41 is a portion for coupling robot hand 40 and robot arm 20. A hand opening and closing motor (not illustrated) is provided in coupling portion 41 to control opening or closing of each of the plurality of finger portions 42. The plurality of finger portions 42 are opened and closed by sliding in the Y-axis direction, but may be configured to be opened to a state where surfaces of belts 43 are horizontal on an XY plane. Note that, a force sensor (not illustrated), an imaging unit for determining the posture of the gripped target object, and the like may be further provided, and the opening or closing of the plurality of finger portions 42 may be controlled based on detection results by the force sensor and the imaging unit.

Robot hand 40 includes two finger portions 42_a_ and 42_b_. Finger portion 42_a_ includes one endless annular belt 43_a_ and belt motor 44_a_ corresponding thereto. On the other hand, finger portion 42_b_ includes two endless annular belts 43_b_ and 43_c_ and belt motors 44_b_ and 44_c_ corresponding thereto.

Figure 9:
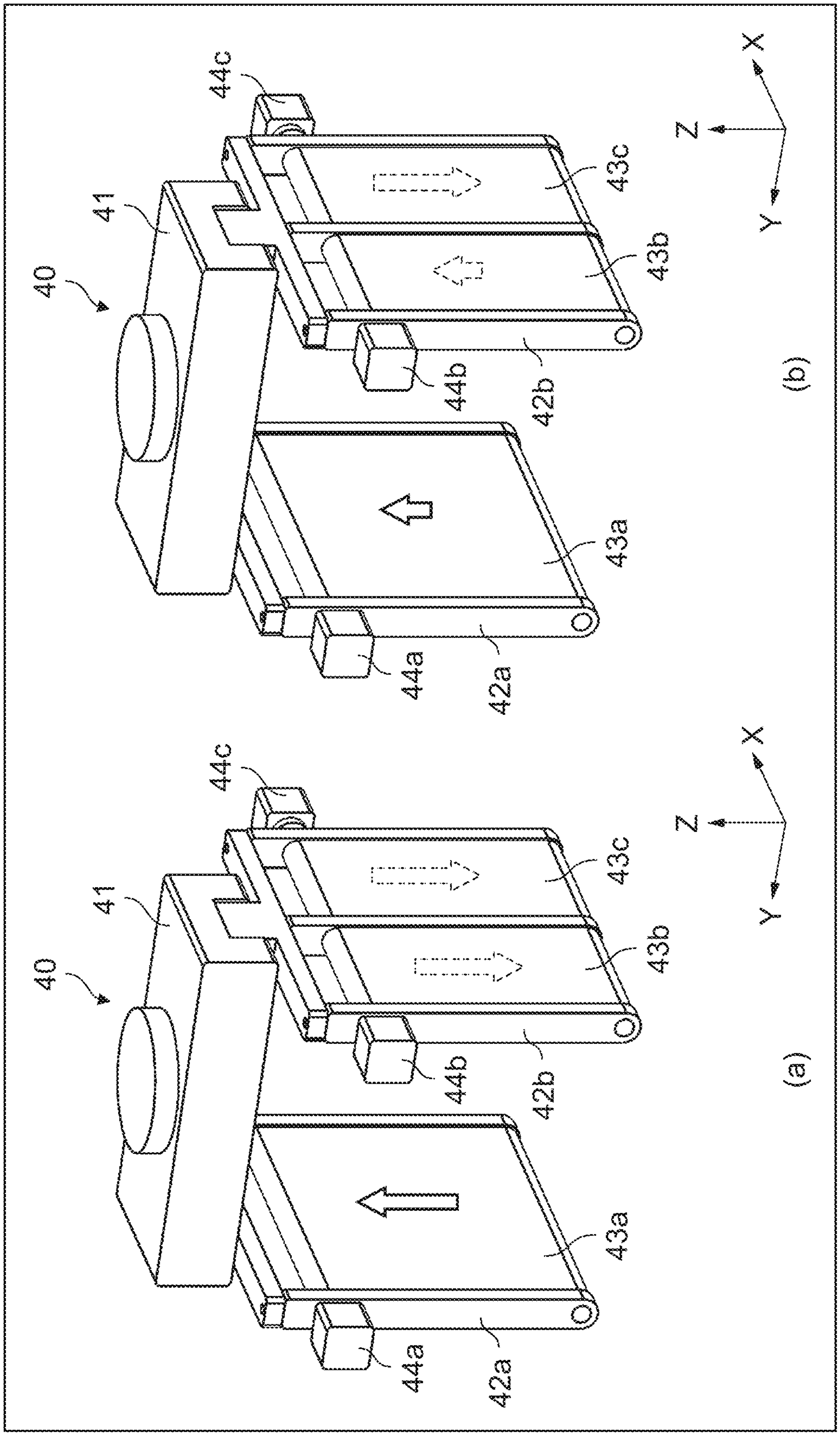
FIG. 9 is an external perspective view for explaining movement of a robot hand according to Modification 1.

FIG. 9 is an external perspective view for explaining movement of robot hand 40 according to the present exemplary embodiment. Here, two finger portions 42_a_ and 42_b_ are opened by a hand opening and closing motor (not illustrated). Two finger portions 42_a_ and 42_b_ slide in the Y-axis direction to reduce a distance, and thus, two finger portions enter a closed state. As a result, two finger portions can grip the target object. Arrows illustrated in FIG. 9 indicate moving directions of belts 43 inside robot hand 40 gripping the target object. In (a) of FIG. 9, belt 43_a_ of finger portion 42_a_ is counterclockwise about the X-axis direction by an operation of belt motor 44_a_. In addition, two belts 43_b_ and 43_c_ of finger portion 42_b_ are counterclockwise about the X-axis direction by operations of belt motors 44_b_ and 44_c_, respectively. Here, an example in which moving speeds of belts 43, that is, rotation speeds of belt motors 44 are the same is illustrated, but the belts are operable at different rotation speeds.

(b) of FIG. 9 illustrates an example in which belt 43_a_ of finger portion 42_a_ is counterclockwise about the X-axis direction by an operation of belt motor 44_a_, and a moving speed used herein is smaller than in the state of (a) of FIG. 9. In addition, belt 43_b_ of finger portion 42_b_ is clockwise about the X-axis direction by an operation of belt motor 44_b_, and a moving speed used herein is the same as belt 43_a_ of finger portion 42_a_. In addition, belt 43_c_ o finger portion 42_b_ is counterclockwise about the X-axis direction by an operation of belt motor 44_c_, and is the same as the state of (a) of FIG. 9.

In the case of the configuration example of robot hand 40 illustrated in FIG. 8, the gripped target object can be rotated about the X-axis by operating the robot hand as illustrated in (a) of FIG. 9. In addition, the gripped target object can be rotated about the Y-axis by operating the robot hand as illustrated in (b) of FIG. 9. However, direct rotation about the Z-axis cannot be performed.

Therefore, similarly to robot hand 10 described above, the control processing illustrated in FIG. 5 is performed, and thus, it is possible to change the posture about the Z-axis, that is, about the third axis. In robot hand 40 having this configuration, the above 10 patterns can also be used.

(Modification 2)

Figure 10:
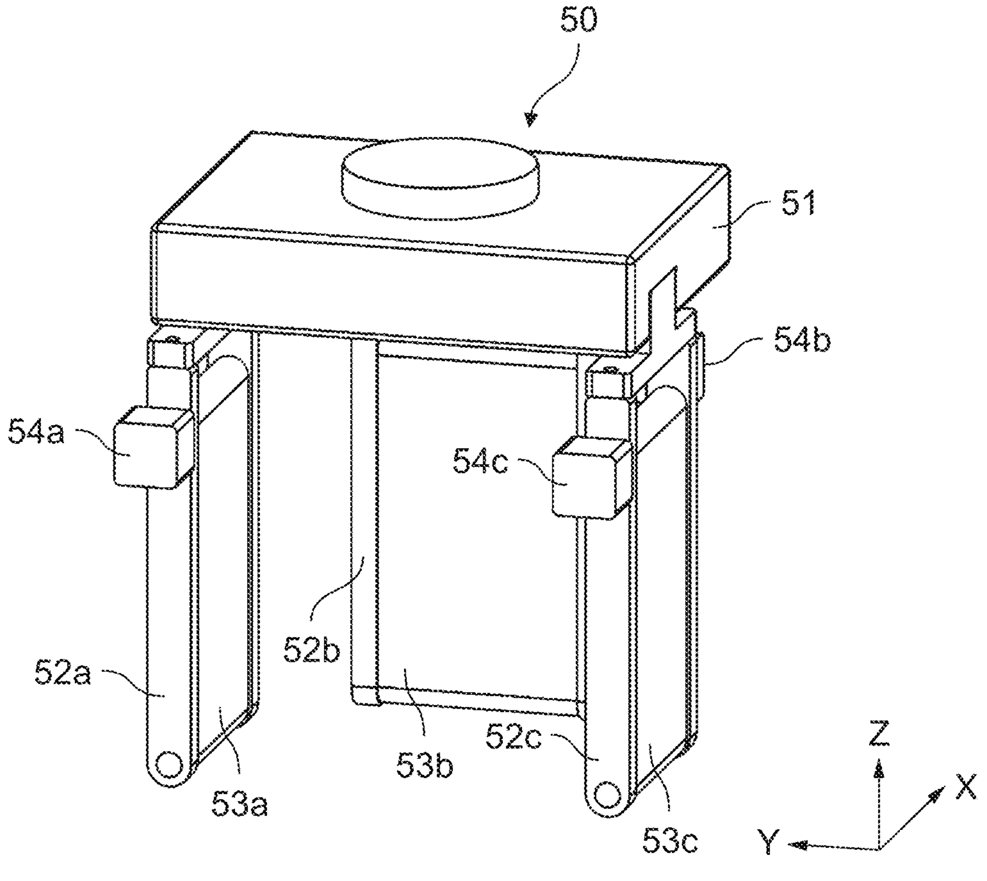
FIG. 10 is an external perspective view illustrating Modification 2 of the robot hand according to the first exemplary embodiment.

FIG. 10 is an external perspective view of robot hand 50 which is Modification 2 of the robot hand according to the present exemplary embodiment. Robot hand 50 includes coupling portion 51 and a plurality of finger portions 52. Coupling portion 51 is a portion for coupling robot hand 50 and robot arm 20. A hand opening and closing motor (not illustrated) is provided in coupling portion 51 to control opening or closing of each of the plurality of finger portions 52. The plurality of finger portions 52 are opened and closed by sliding in the X direction or the Y-axis direction, but may be configured to be opened to a state where surfaces of belts 53 are horizontal on an XY plane. Note that, a force sensor (not illustrated), an imaging unit for determining the posture of the gripped target object, and the like may be further provided, and the opening or closing of the plurality of finger portions 52 may be controlled based on detection results by the force sensor and the imaging unit. In Modification 2, three finger portions 52 are installed for coupling portion 51 having a box shape. Here, in a case where coupling portion 51 is viewed along the Z-axis direction, one finger portion is installed on one surface in a longitudinal direction, and the finger portions are installed on each of two surfaces in a lateral direction. However, the present disclosure is not limited thereto. For example, the finger portions may be installed on one surface in the lateral direction, and the finger portions may be installed on each of two surfaces in the longitudinal direction.

Robot hand 50 includes three finger portions 52_a_, 52_b_, and 52_c_. Finger portions 52_a_ to 52_c_ include endless annular belts 53_a_, 53_b_, and 53_c_, and belt motors 54_a_, 54_b_, and 54_c_ corresponding thereto, respectively.

Figure 11:
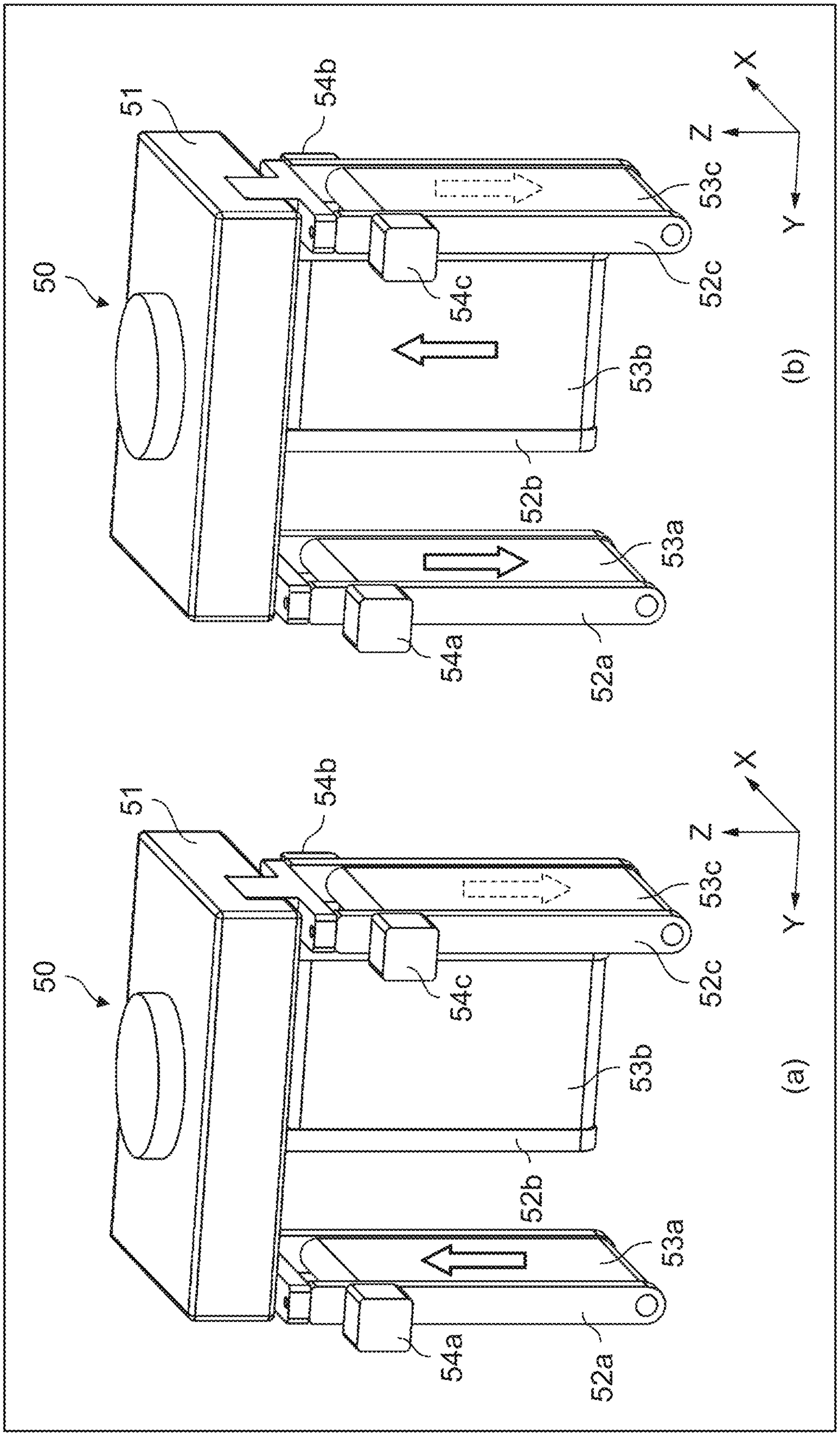
FIG. 11 is an external perspective view for explaining movement of a robot hand according to Modification 2.

FIG. 11 is an external perspective view for explaining movement of robot hand 50 according to the present exemplary embodiment. Here, three finger portions 52_a_ to 52_c_ are opened by a hand opening and closing motor (not illustrated). Two finger portions 52_a_ and 52_c_ slide in the Y-axis direction to reduce a distance, and finger portion 52_b_ slides in the X-axis direction to enter a closed state. As a result, the finger portions can grip the target object. Arrows illustrated in FIG. 11 indicate moving directions of belts 53 inside robot hand 50 gripping the target object. In (a) of FIG. 11, belt 53_a_ of finger portion 52_a_ is counterclockwise about the X-axis direction by an operation of belt motor 54_a_. In addition, belt 53_b_ of finger portion 52_b_ is stopped. In addition, belt 53_c_ of finger portion 52_c_ is counterclockwise about the X-axis direction by an operation of belt motor 54_c_. Here, an example in which moving speeds of belts 53_a_ and 53_c_, that is, rotation speeds of belt motors 54_a_ and 54_c_ are the same is illustrated, but the belts are operable at different rotation speeds.

In (b) of FIG. 11, belt 53_a_ of finger portion 52_a_ is clockwise about the X-axis direction by an operation of belt motor 54_a_. In addition, belt 53_b_ of finger portion 52_b_ is clockwise about the Y-axis direction as viewed from belt motor 54_b_ by an operation of belt motor 54_b_. In addition, belt 53_c_ of finger portion 52_b_ is counterclockwise about the X-axis direction by an operation of belt motor 54_c_.

In the case of the configuration example of robot hand 50 illustrated in FIG. 10, the gripped target object can be rotated about the X-axis by operating the robot hand as illustrated in (a) of FIG. 11. In addition, the gripped target object can be rotated about the Y-axis by operating the robot hand as illustrated in (b) of FIG. 11. However, direct rotation about the Z-axis cannot be performed.

Therefore, the posture can be changed about the Z-axis, that is, about the third axis by the control processing illustrated in FIG. 12 below. In robot hand 50 having this configuration, the above 10 patterns can also be used.

[Control Processing]

Figure 12:
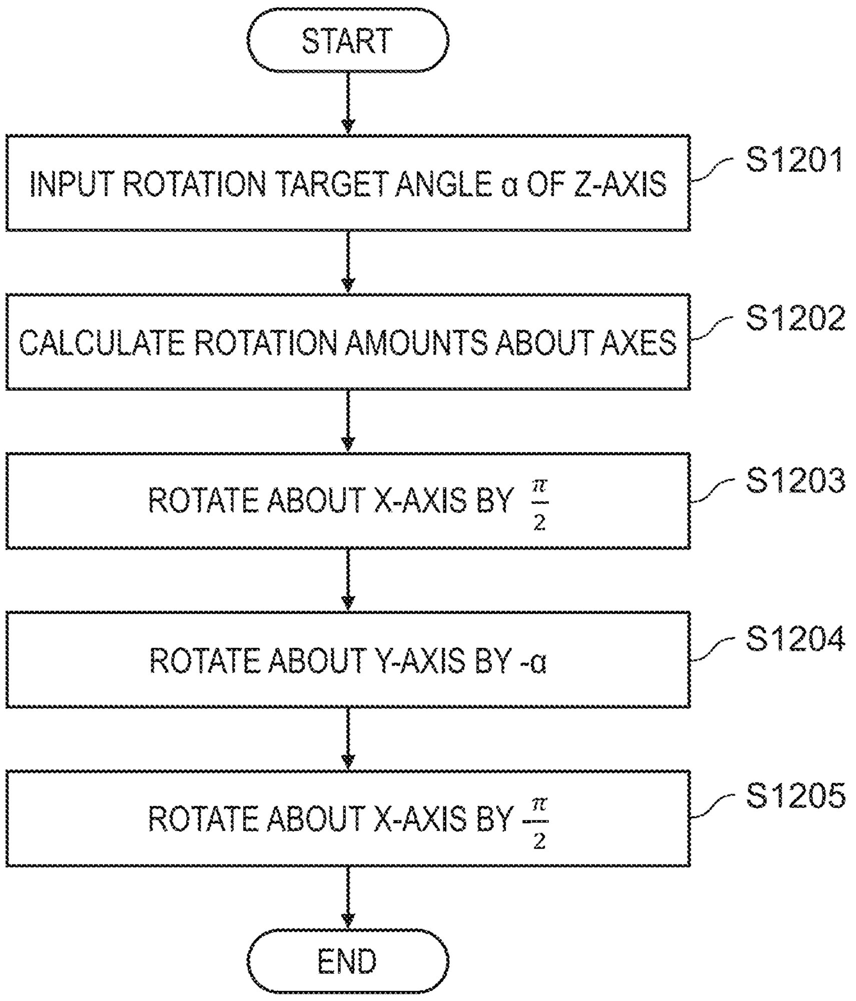
FIG. 12 is a flowchart of control processing of the robot hand according to Modification 2.

FIG. 12 is a flowchart of control processing of robot hand 50 according to Modification 2. Each process in the flowchart is realized by control system 100 controlling robot hand 50. Note that, it is assumed that control system 100 controls robot 1 before this control processing is performed such that the target object is gripped by robot hand 50. In addition, the control related to the change in the posture about the Z-axis in which robot hand 50 cannot directly change the posture of the target object will be described as an example.

Here, an example using a combination of parameters corresponding to Pattern (1) among the above definitions will be described.

In step S1201, control system 100 inputs rotation target angle α about the Z-axis of the target object gripped by robot hand 50. Note that, rotation target angle α may be indicated by an absolute rotation angle that is a rotation angle from a reference position defined in advance, or may be indicated by any of relative rotation angles based on a position in a current posture. Rotation target angle α may be input based on, for example, a parameter designated by the user via input device 104 or the like, or may be input based on a parameter defined based on a work to be executed by the robot system. In addition, clockwise along the arrow of each axis illustrated in each drawing is a positive (+) direction, and counterclockwise is a negative (−) direction.

In step S1202, control system 100 calculates rotation amounts about the X-axis and the Y-axis with respect to the gripped target object based on rotation target angle α designated in step S1201. That is, control amounts corresponding to rotation angles φ, ν, and ψ of the first to third rotation controls are derived. Movement amounts of belts 53 corresponding to the rotation amounts about the X-axis and the Y-axis used herein, that is, rotation amounts and rotation speeds of belt motors 54 may be defined in advance in accordance with the size of the gripped target object, degrees of opening and closing of the plurality of finger portions 52 by a hand opening and closing motor, and the like.

In step S1203, control system 100 rotates the gripped target object about the X-axis by a rotation angle of π/2 (that is, rotation angle q), as the first rotation control. The operation of finger portions 52 of robot hand 50 in this process is as illustrated in (a) of FIG. 11. Note that, since (a) of FIG. 11 illustrates an example of a case where the rotation about the X-axis in the positive direction is performed, in the case of the rotation in the negative direction, orientations of arrows indicating directions in which belts 53 are moved are all reversed. Note that, belt 53*b* of stopped finger portion 52*b* remains stopped even in a case where the rotation about the X-axis is reversed. In addition, in a case where there is a stopped belt when rotation in a certain axial direction is performed as illustrated in (a) of FIG. 11, a position of the finger at a position may be adjusted such that the stopped belt does not come into contact with the target object or friction more than necessary does not occur for the purpose of not hindering the rotation. Alternatively, the rotation of a certain axis may be adjusted such that the finger of the stopped belt supports the target object such that variation at other positions does not occur.

In step S1204, control system 100 rotates the gripped target object about the Y-axis by a rotation angle of −α (that is, rotation angle θ), as the second rotation control. The operation of finger portions 52 of robot hand 50 in this process is as illustrated in (b) of FIG. 11. Note that, since (b) of FIG. 11 illustrates an example of a case where the rotation about the Y-axis in the negative direction is performed, in the case of the rotation in the positive direction, orientations of arrows indicating directions in which belts 53 are moved are all reversed.

In step S1205, control system 100 rotates the gripped target object about the X-axis by a rotation angle of −π/2 (that is, rotation angle ψ), as the third rotation control. The operation of finger portions 52 of robot hand 50 in this process is a reverse rotation in (a) of FIG. 11. This flowchart is ended.

(Control Example)

Figure 13:
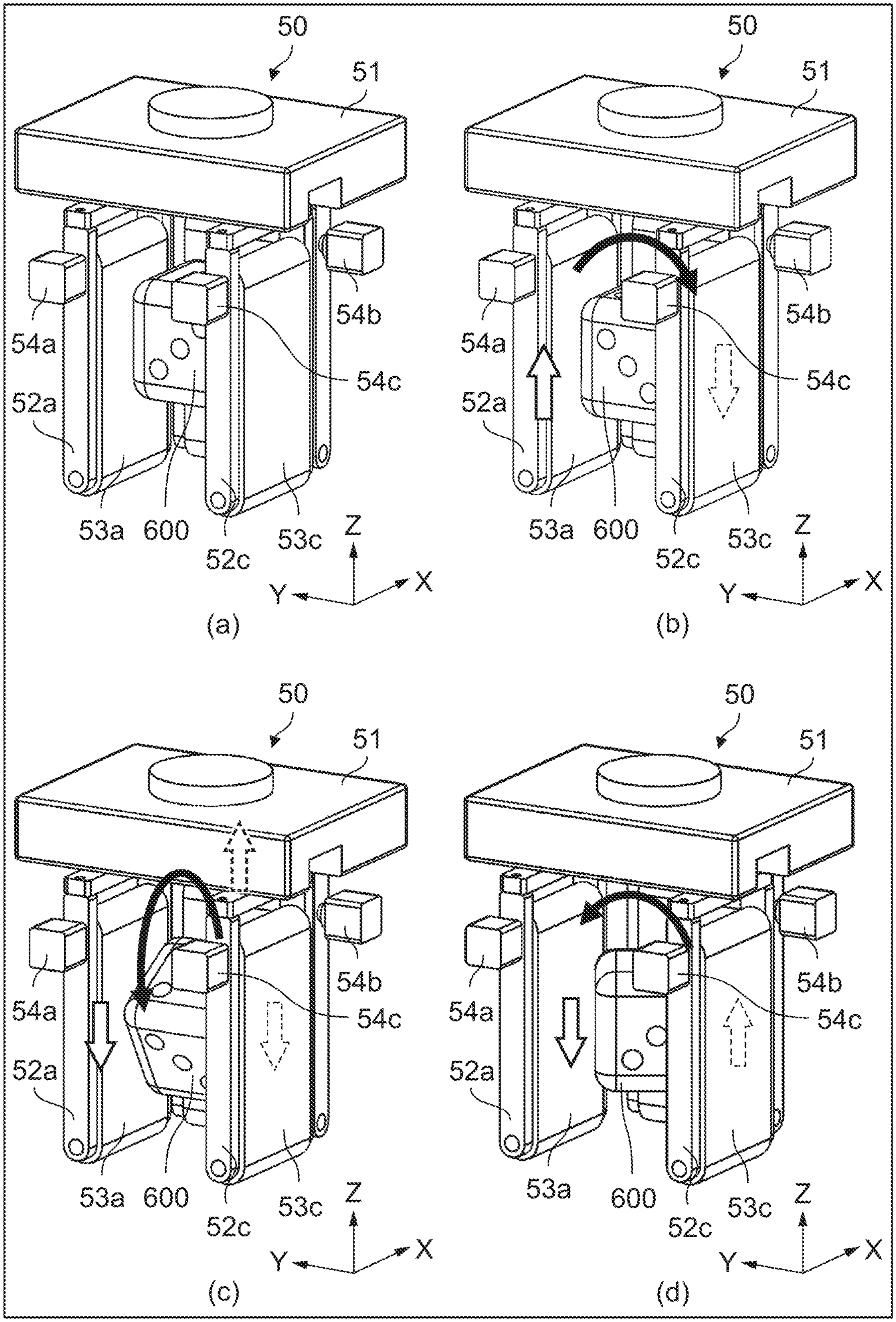
FIG. 13 is a diagram for explaining a change in posture of dice by the robot hand according to Modification 2.

FIG. 13 is an external perspective view illustrating a transition when the posture of dice 600 is changed by rotation target angle α about the Z-axis by the processing flow illustrated in FIG. 12 in robot hand 50 having the configuration illustrated in FIG. 10. The state transition of dice 600 is as illustrated in FIG. 6. In addition, in FIG. 13, white arrows and broken line arrows indicate the moving directions of belts 53 on contact surfaces between dice 600 and belts 53 of each finger portion 52.

(a) of FIG. 13 illustrates a state at a start point in time of the processing flow of FIG. 12. (b) of FIG. 13 illustrates a state where the process of step S1203 of FIG. 12 is performed, and the rotation in the positive direction about the X-axis is performed. (c) of FIG. 13 illustrates a state where the process of step S1204 of FIG. 12 is performed, and the negative rotation about the Y-axis is performed. (d) of FIG. 13 illustrates a state where the process of step S1205 of FIG. 12 is performed, and the negative rotation about the X-axis is performed. As a result, dice 600 takes the rightmost posture in (b) of FIG. 6 and (c) of FIG. 6, that is, the target posture.

(Modification 3)

Figure 14:
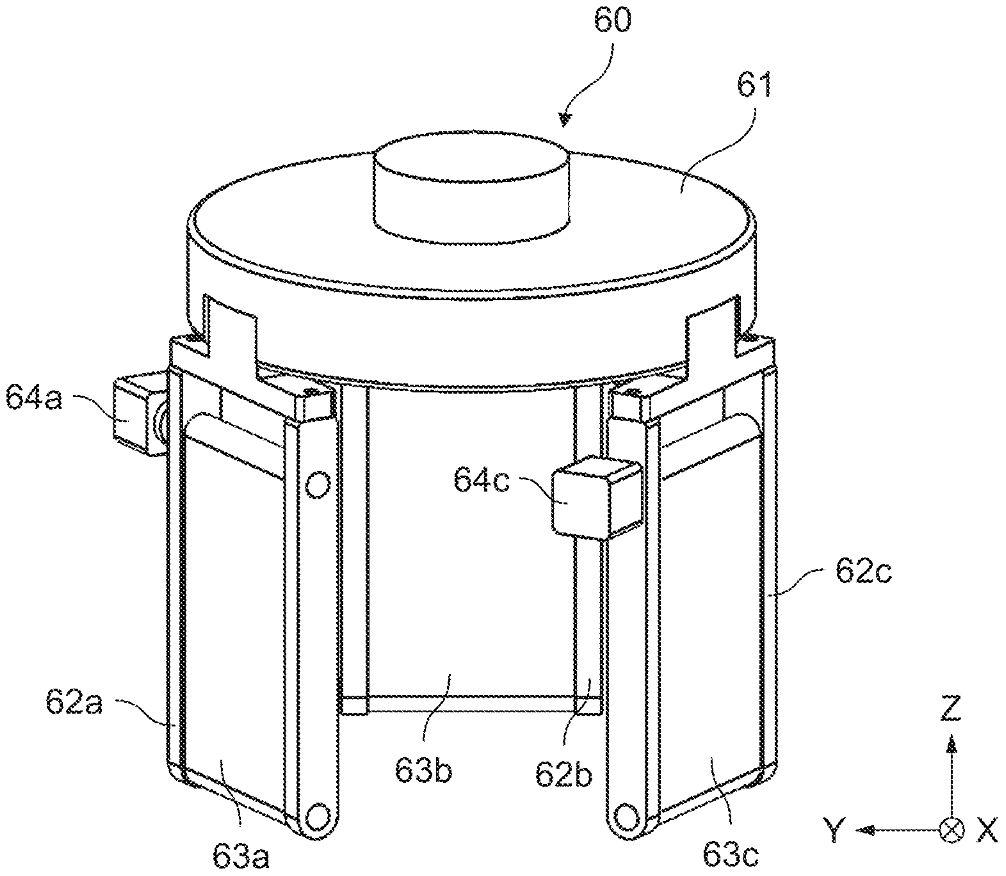
FIG. 14 is an external perspective view illustrating Modification 3 of the robot hand according to the first exemplary embodiment.

FIG. 14 is an external perspective view of robot hand 60 which is Modification 3 of the robot hand according to the present exemplary embodiment. Robot hand 60 includes coupling portion 61 and a plurality of finger portions 62. Coupling portion 61 is a portion for coupling robot hand 60 and robot arm 20. A hand opening and closing motor (not illustrated) is provided in coupling portion 61 to control opening or closing of each of the plurality of finger portions 62. The plurality of finger portions 62 are opened and closed by sliding inward, but may be configured to be opened to a state where surfaces of belts 63 are horizontal on an XY plane. Note that, a force sensor (not illustrated), an imaging unit for determining the posture of the gripped target object, and the like may be further provided, and the opening or closing of the plurality of finger portions 62 may be controlled based on detection results by the force sensor and the imaging unit. In the configuration example of the robot hand described above, although the coupling portion has a box shape, in Modification 3, coupling portion 61 has a configuration having a columnar shape, and the plurality of finger portions 62 are installed at equal intervals on a circumference thereof. Note that, installation intervals between finger portions 62 are not necessarily equal intervals, and may be different intervals as long as control corresponding to an operation to be described later can be realized.

Robot hand 60 includes three finger portions 62*a*, 62*b*, and 62*c*. Finger portions 62*a* to 62*c* include endless annular belt 63*a*, 63*b*, and 63*c*, and belt motors 64*a*, 64*b*, and 64*c* corresponding thereto, respectively.

Figure 15:
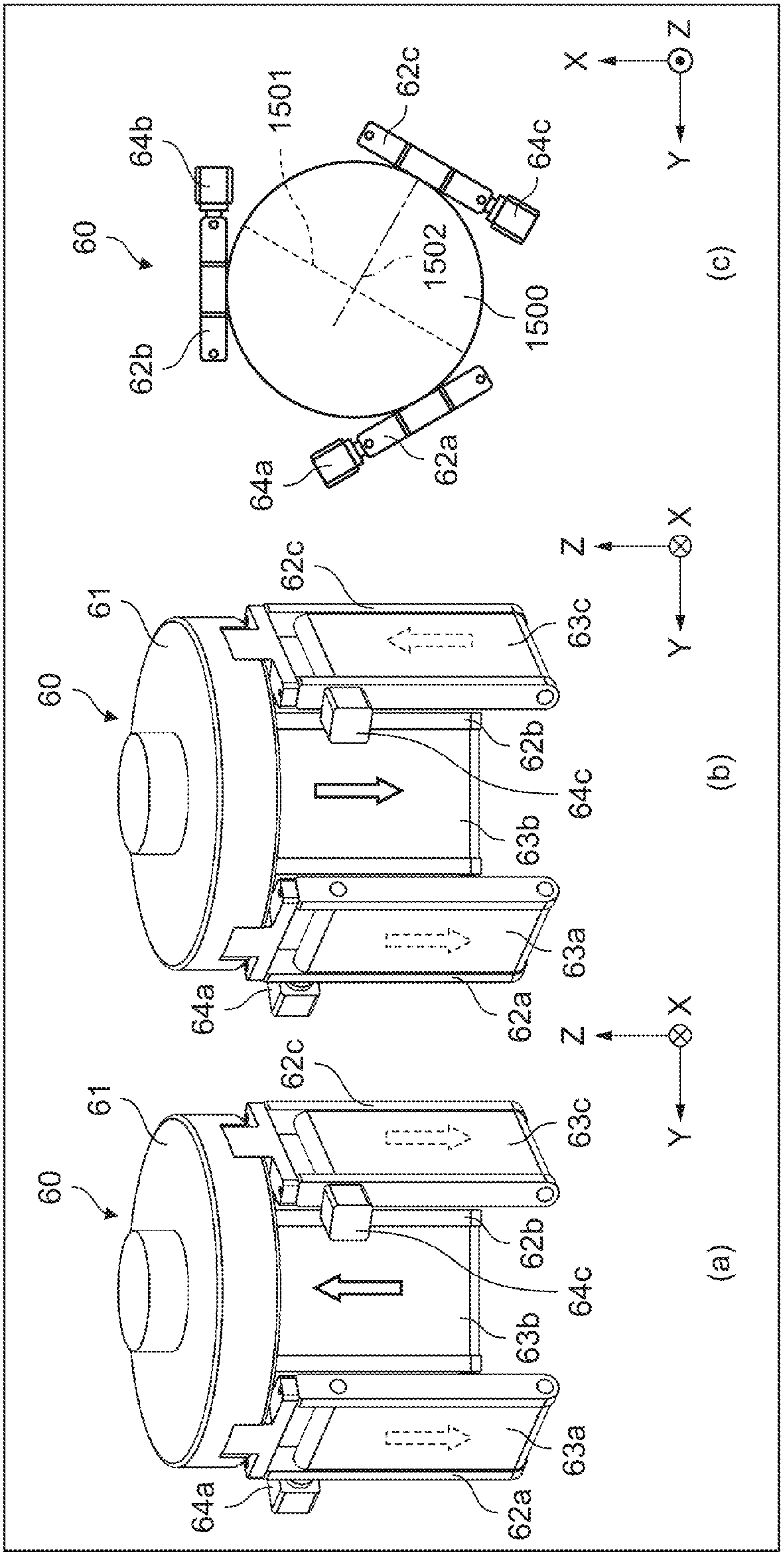
FIG. 15 is an external perspective view for explaining movement of a robot hand according to Modification 3.

FIG. 15 is an external view for explaining movement of robot hand 60 according to the present exemplary embodiment. Here, three finger portions 62*a* to 62*c* are opened by a hand opening and closing motor (not illustrated). Three finger portions 62*a* to 62*c* slide inward to reduce a distance, and thus, two finger portions enter a closed state. As a result, two finger portions can grip the target object. Arrows illustrated in FIG. 15 indicates moving directions of belts 63 inside robot hand 60 gripping the target object. (a) of FIG. 15 is an external perspective view of robot hand 60. Belt 63*a* of finger portion 62*a* is counterclockwise about a rotation axis as viewed from belt motor 64*a* by an operation of belt motor 64*a*. In addition, belt 63*b* of finger portion 62*b* is clockwise about a rotation axis as viewed from belt motor 64*b* by an operation of belt motor 64*b*. In addition, belt 63*c* of finger portion 62*c* is counterclockwise about a rotation axis as viewed from belt motor 64*c* by an operation of belt motor 64*c*. In (b) of FIG. 15, belt 63*a* of finger portion 62*a* is counterclockwise about a rotation axis as viewed from belt motor 64*a* by an operation of belt motor 64*a*. In addition, belt 63*b* of finger portion 62*b* is counterclockwise about the rotation axis as viewed from belt motor 64*b* by the operation of belt motor 64*b*. In addition, belt 63*c* of finger portion 62*c* is clockwise about the rotation axis as viewed from belt motor 64*c* by the operation of belt motor 64*c*. (a) of FIG. 15 and (b) of FIG. 15 illustrate an example in which rotation speeds of belts 63*a* to 63*c* are the same, but the belts are operable at different rotation speeds.

(c) of FIG. 15 is a diagram of robot hand 60 as viewed from above along the Z-axis. A state where target object 1500 having a spherical shape is gripped by three finger portions 62*a* to 62*c* is illustrated. Axis 1501 indicates a rotation axis of target object 1500 in a case where belts 63*a* to 63*c* of three finger portions 62*a* to 62*c* are moved as illustrated in (b) of FIG. 15. In addition, axis 1502 is an axis orthogonal to axis 1501 and is a normal line orthogonal to a surface of belt 63*c* of finger portion 62*c*.

In the case of the configuration example of robot hand 60 illustrated in FIG. 14, the gripped target object can be rotated about the Y-axis by operating the robot hand as illustrated in (a) of FIG. 15. In addition, the gripped target object can be rotated about axis 1501 illustrated in (c) of FIG. 15 by operating the robot hand as illustrated in (b) of FIG. 15. However, direct rotation about the Z-axis cannot be performed.

Therefore, the posture can be changed about the Z-axis, that is, about the third axis by the control processing illustrated in FIG. 16 below. In robot hand 60 having this configuration, the above 10 patterns can also be used.

[Control Processing]

Figure 16:
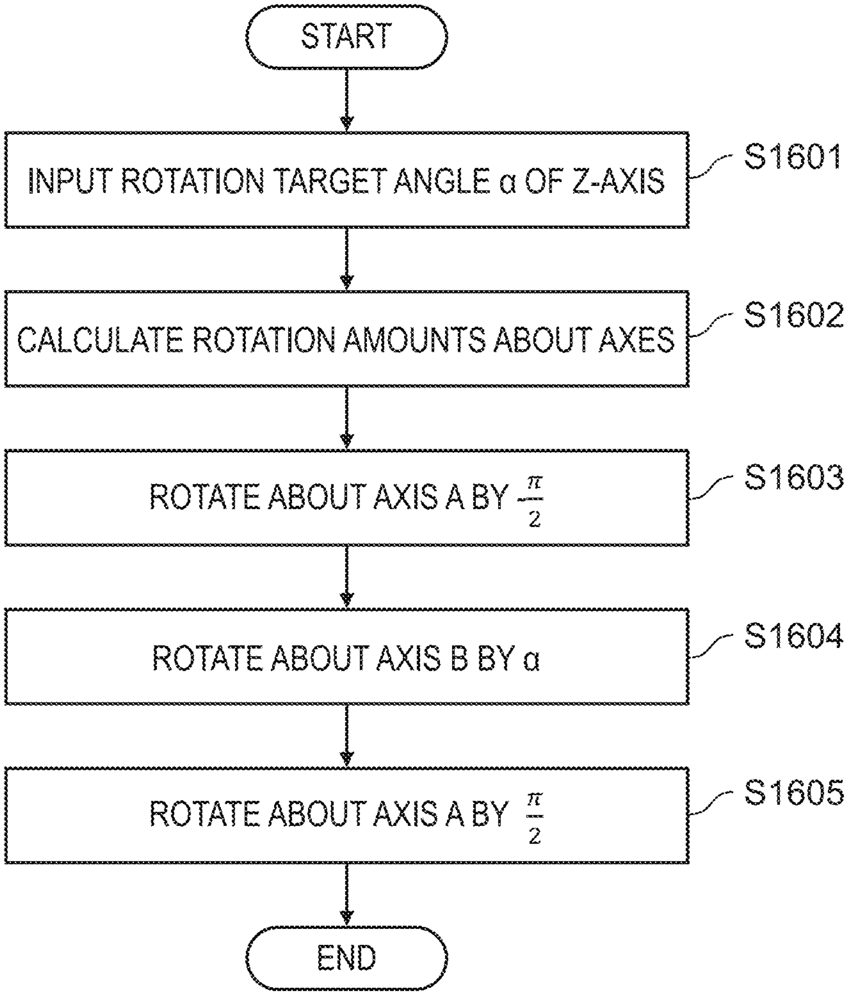
FIG. 16 is a flowchart of control processing of the robot hand according to Modification 3.

FIG. 16 is a flowchart of control processing of robot hand 60 corresponding to Modification 3 of the present exemplary embodiment. Each process in the flowchart is realized by control system 100 controlling robot hand 60. Note that, it is assumed that control system 100 controls robot 1 before this control processing is performed such that the target object is gripped by robot hand 60. Here, the control related to the change in the posture about the Z-axis in which robot hand 60 in FIG. 14 cannot directly change the posture of the target object will be described as an example. In addition, axes illustrated in the processes illustrated in FIG. 16 are specifically illustrated in FIGS. 19 to 21.

Here, an example using a combination of parameters corresponding to Pattern (2) among the above definitions will be described.

In step S1601, control system 100 inputs rotation target angle α about the Z-axis of the target object gripped by robot hand 60. Note that, rotation target angle α may be indicated by an absolute rotation angle that is a rotation angle from a reference position defined in advance, or may be indicated by any of relative rotation angles based on a position in a current posture. Rotation target angle α may be input based on, for example, a parameter designated by the user via input device 104 or the like, or may be input based on a parameter defined based on a work to be executed by the robot system. In addition, clockwise along the arrow of each axis illustrated in each drawing is a positive (+) direction, and counterclockwise is a negative (−) direction.

In step S1602, control system 100 calculates rotation amounts about the axes with respect to the gripped target object based on rotation target angle α designated in step S1601. That is, control amounts corresponding to rotation angles φ, θ, and ψ of the first to third rotation controls are derived. Here, rotation angle φ about axis A, rotation angle θ about axis B, and rotation angle ψ about axis A, which will be described later, are calculated. The rotation amounts corresponding to the axes used herein may be defined by a known rotation matrix based on the Euler angle by axis A and axis B defined in accordance with the configuration of robot hand 60 and rotation target angle α. In addition, movement amounts of belts 63 corresponding to the rotation amounts about the axes, that is, rotation amounts and rotation speeds of belt motors 64 may be defined in advance in accordance with the size of the gripped target object, degrees of opening and closing of the plurality of finger portions 62 by a hand opening and closing motor (not illustrated), and the like. Note that, for the sake of convenience, rotation angle φ, rotation angle θ, and rotation angle ψ are also sequentially referred to as a first rotation amount, a second rotation amount, and a third rotation amount.

In step S1603, control system 100 rotates the target object about axis A by rotation angle φ that is the first rotation amount, as the first rotation control. Note that, in the case of the configuration of robot hand 60 illustrated in FIG. 14, rotation angle q is −π/2 based on Pattern (2).

In step S1604, control system 100 rotates the target object about axis B by rotation angle θ which is the second rotation amount, as the second rotation control. Note that, in the case of the configuration of robot hand 60 illustrated in FIG. 14, rotation angle θ is a based on Pattern (2).

In step S1605, control system 100 rotates the target object about axis A by rotation angle ψ that is the third rotation amount, as the third rotation control. Note that, in the case of the configuration of robot hand 60 illustrated in FIG. 14, rotation angle ψ is π/2 based on Pattern (2). This flowchart is ended.

(Control Example)

Through the above series of control, robot hand 60 can change the posture of the gripped target object about the Z-axis. Specific examples will be described with reference to FIGS. 17 to 21. Here, a case where dice 600 is used as an example of the target object will be described.

Figure 17:
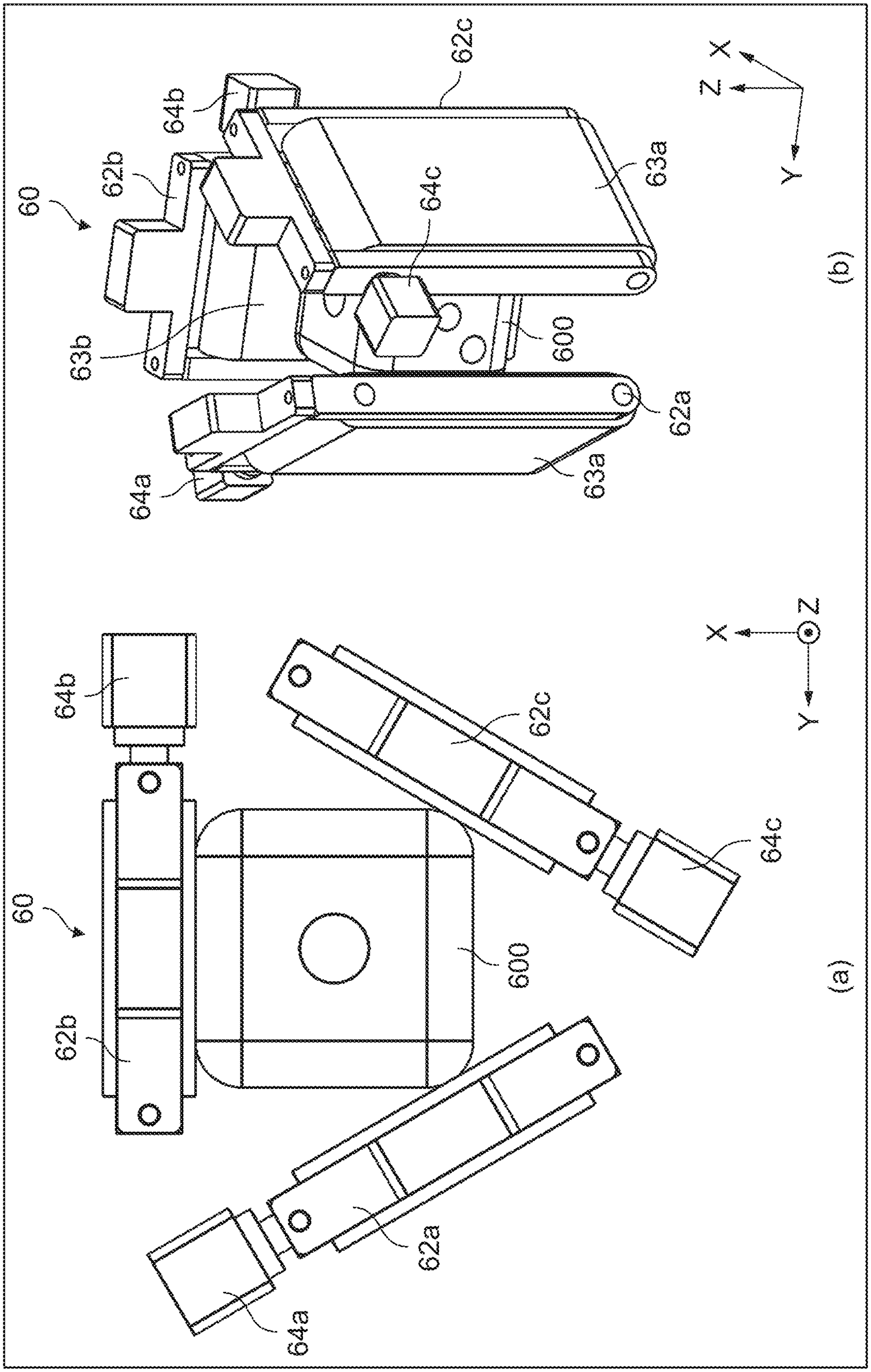
FIG. 17 is a diagram for explaining a change in posture of dice by the robot hand according to Modification 3.
Figure 18:
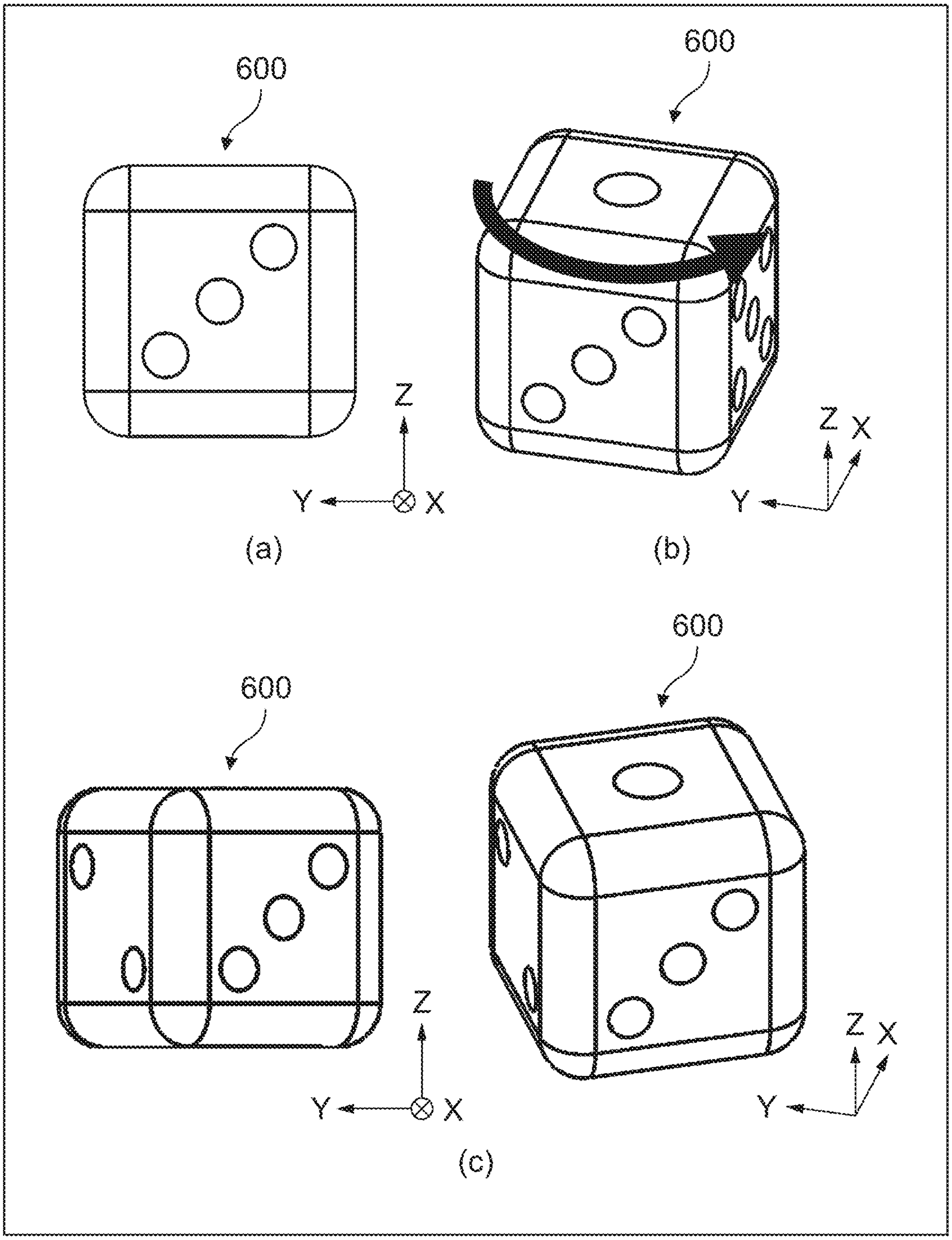
FIG. 18 is a diagram for explaining the change in posture of the dice by the robot hand according to Modification 3.

Dice 600 in a state illustrated in (a) and (b) of FIG. 18 is rotated about the Z-axis by rotation target angle α, and this posture is set as a target posture. (a) of FIG. 18 is the state of dice 600 before the transition viewed from the front along the X-axis, and (b) of FIG. 18 is a perspective view of dice 600 before the transition. (c) of FIG. 18 illustrates a case where dice 600 in the target posture is viewed from the front along the X-axis and a case where the dice are viewed in a perspective manner. In the present example, robot hand 60 grips dice 600 in the state of FIG. 17.

Figure 19:
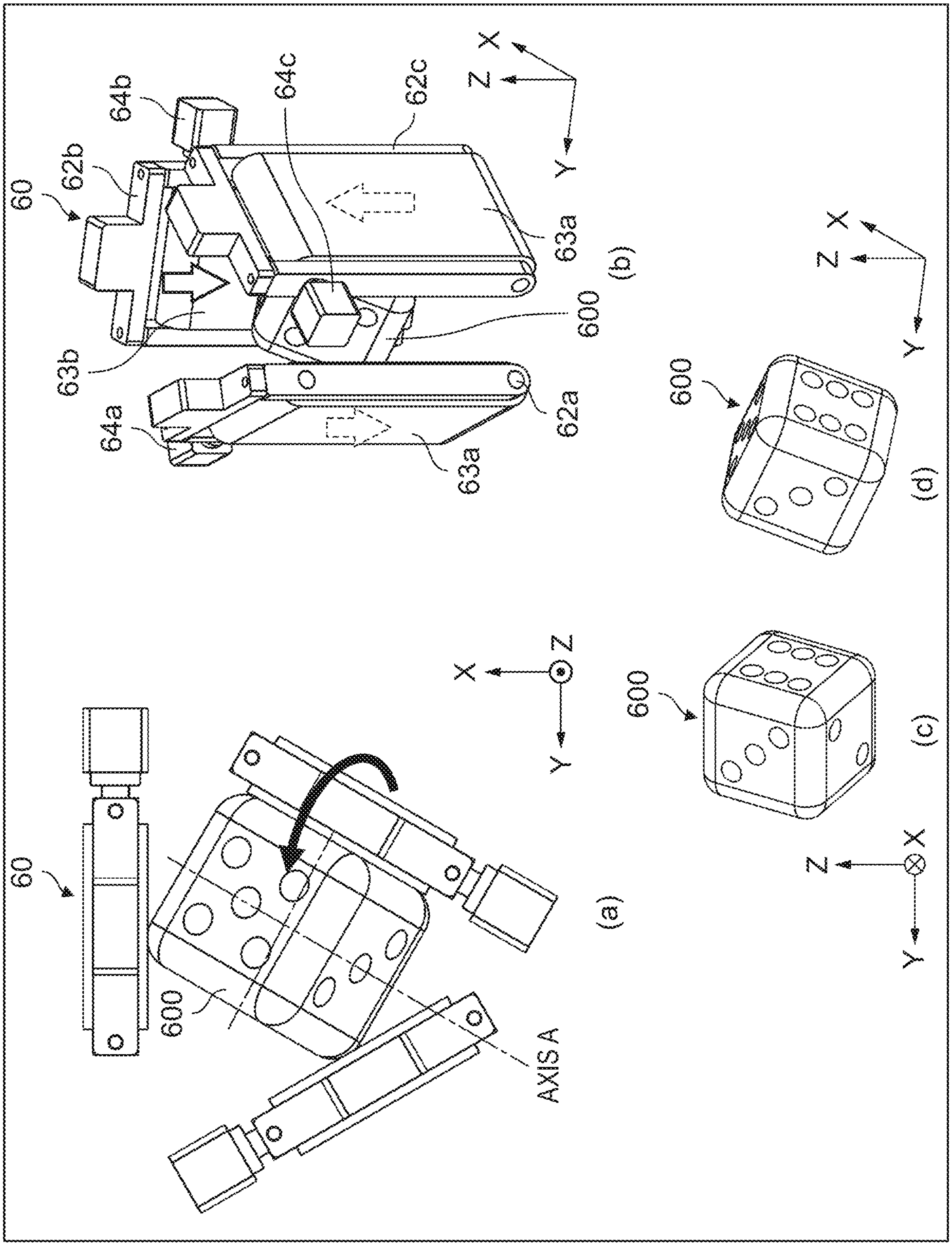
FIG. 19 is a diagram for explaining the change in posture of the dice by the robot hand according to Modification 3.
Figure 20:
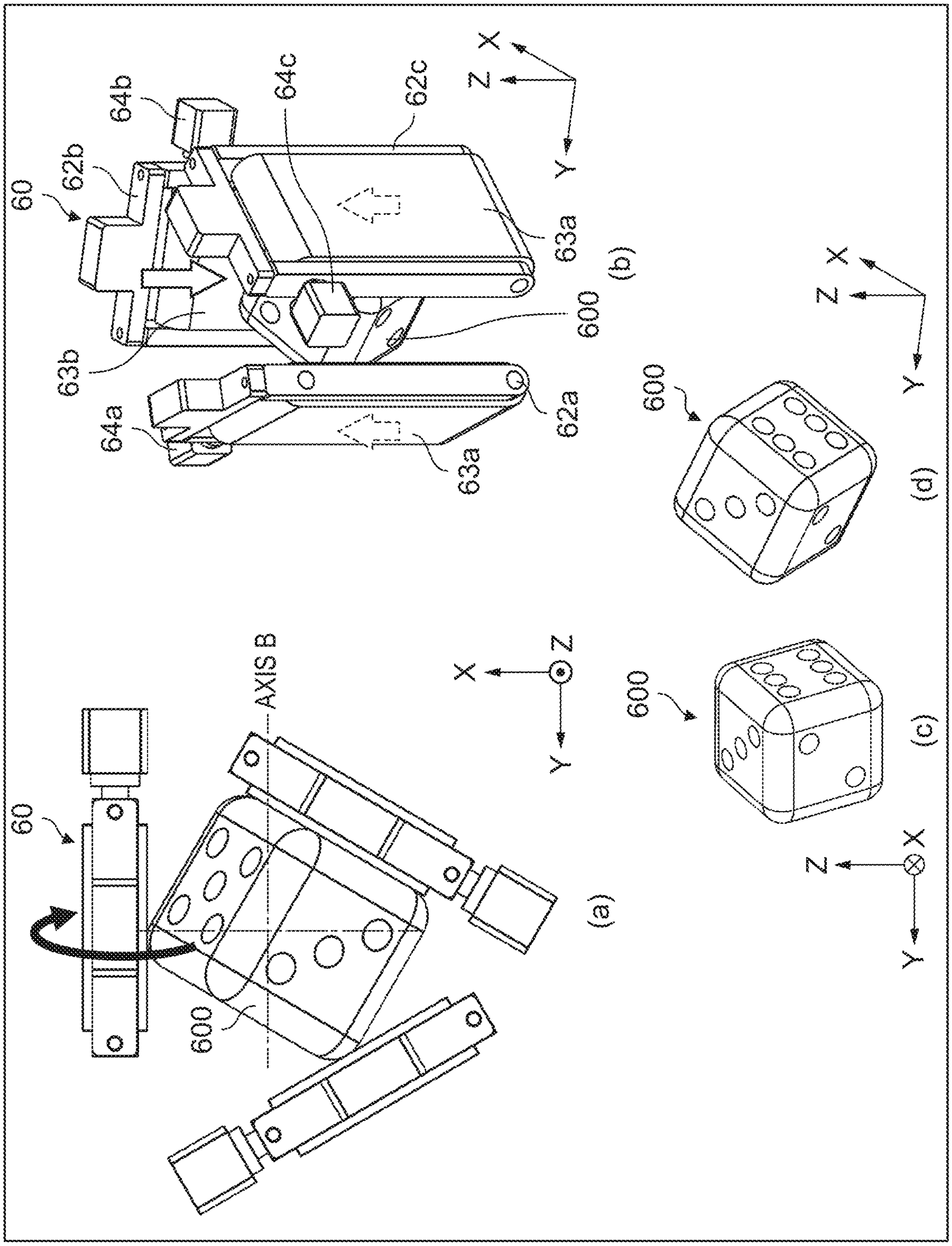
FIG. 20 is a diagram for explaining the change in posture of the dice by the robot hand according to Modification 3.
Figure 21:
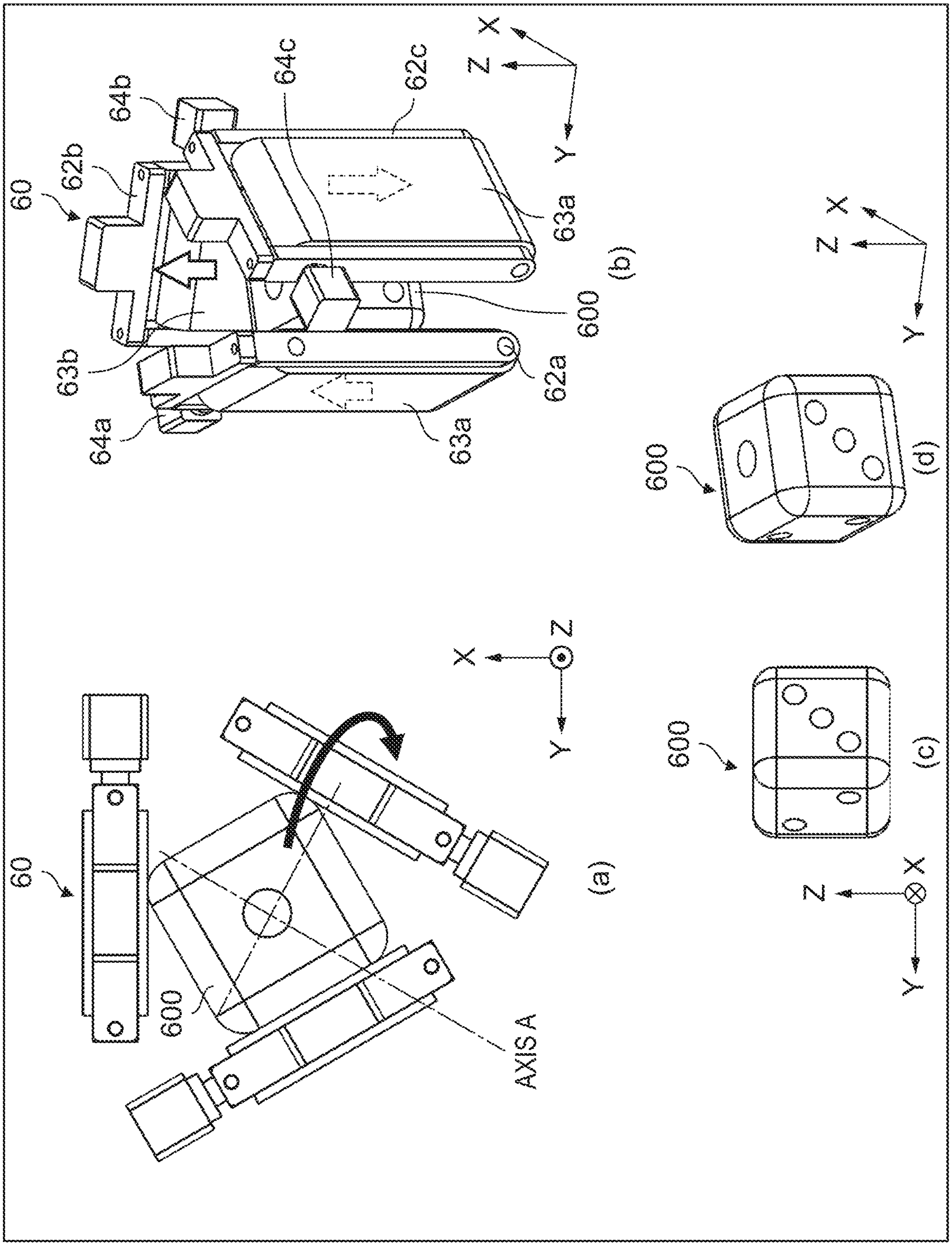
FIG. 21 is a diagram for explaining the change in posture of the dice by the robot hand according to Modification 3.

FIGS. 19 to 21 are diagrams illustrating the transition of the posture of the dice by robot hand 60 along the processes of the processing flow of FIG. 16. The description will be given assuming that the state illustrated in FIG. 17 is obtained at a point in time when the processing flow of FIG. 16 is started. In addition, arrows illustrated in FIGS. 19 to 21 indicate moving directions of belts 63 inside robot hand 60 gripping the target object.

FIG. 19 corresponds to the operation of the process (first rotation control) of step S1603 of FIG. 16. From the state illustrated in FIG. 17, each finger portion of robot hand 60 is operated as illustrated in (b) of FIG. 19 to rotate about axis A by rotation angle φ which is the first rotation amount as illustrated in (a) of FIG. 19. At this time, in a case where axis A is viewed from a front side to a back side in (b) of FIG. 19, dice 600 is counterclockwise (negative orientation) about axis A. As a result, the posture of dice 600 is as illustrated in (c) of FIG. 19 and (d) of FIG. 19. (c) of FIG. 19 is a diagram of dice 600 viewed from the front along the X-axis, and (d) of FIG. 19 is a perspective view of dice 600.

FIG. 20 corresponds to the operation of the process (second rotation control) of step S1604 of FIG. 16. From the state illustrated in FIG. 19, each finger portion of robot hand 60 is operated as illustrated in (b) of FIG. 20 to rotate about axis B by rotation angle θ which is the second rotation amount as illustrated in (a) of FIG. 20. At this time, in a case where axis B is viewed along the Y-axis direction in (b) of FIG. 19, dice 600 is clockwise (positive orientation) about axis B. As a result, the posture of dice 600 is as illustrated in (c) of FIG. 20 and (d) of FIG. 20. (c) of FIG. 20 is a diagram of dice 600 viewed from the front along the X-axis, and (d) of FIG. 20 is a perspective view of dice 600.

FIG. 21 corresponds to the operation of the process (third rotation control) of step S1605 of FIG. 16. From the state illustrated in FIG. 20, each finger portion of robot hand 60 is operated as illustrated in (b) of FIG. 21 to rotate about axis A by rotation angle ψ which is the third rotation amount as illustrated in (a) of FIG. 21. At this time, when axis A is viewed from a front side to a back side in (b) of FIG. 21, dice 600 are clockwise (positive orientation) about axis A. As a result, the posture of dice 600 is as illustrated in (c) of FIG. 21 and (d) of FIG. 21. (c) of FIG. 21 is a diagram of dice 600 viewed from the front along the X-axis, and (d) of FIG. 21 is a perspective view of dice 600. As a result, dice 600 can be caused to transition to the target posture of (c) of FIG. 18.

As described above, according to the present exemplary embodiment, the robot system includes the robot hand (for example, robot hand 10) having the plurality of finger portions (for example, finger portions 12), the belt (for example, belt 13) provided on each of the plurality of finger portions, and the motor (for example, belt motor 14) for driving the belt, and the control device (for example, control system 100) that controls the robot hand. Robot hand 10 can rotate the target object (for example, dice 600) about the first axis (for example, X-axis) on the three-dimensional coordinate axis and about the second axis (for example, Y-axis) different from the first axis by driving the belt provided on each of the plurality of finger portions in a state of gripping the target object. In a case where the target object gripped by the robot hand is in a target posture rotated about the third axis (for example, Z-axis) orthogonal to each of the first axis and the second axis, the control device causes the target object to transition to the target posture by combining the rotation about the first axis and the rotation about the second axis.

As a result, even in the robot hand having a simple configuration with two degrees of freedom corresponding to two axes, it is possible to realize three degrees of freedom and change the posture of the robot hand in a state of gripping the target object.

In addition, in a case where the target object is caused to transition to the target posture rotated about the third axis by rotation target angle α, the control device causes the target object to transition to the target posture by rotating the target object about the first axis (for example, X-axis) by $\pi/2$, rotating the target object the second axis (for example, Y-axis) by $-\alpha$ about, and rotating the target object about the first axis (for example, X-axis) by $-\pi/2$.

As a result, three degrees of freedom are realized by combining simple rotation operations, and the posture of the target object can be changed in a state of being gripped.

In addition, in a case where the target object is caused to transition to the target posture rotated about the third axis by rotation target angle α, the control device rotates the target object about the first axis (for example, X-axis) by $-\pi/2$, rotates the target object about the second axis (for example, Y-axis) by a, and rotates the target object about the first axis (for example, X-axis) by $\pi/2$.

As a result, three degrees of freedom are realized by combining simple rotation operations, and the posture of the target object can be changed in a state of being gripped.

In addition, the total number of independently operable belts provided on the plurality of finger portions is at least three.

As a result, it is possible to adjust the posture of the target object by three degrees of freedom by using the robot hand having the configuration of two degrees of freedom.

In addition, the robot hand (for example, robot hand 10) has two finger portions (for example, finger portions 12*a* and 12*b*), and each of two finger portions has two parallel running belts (for example, belts 13*a* and 13*b*, and belts 13*c* and 13*d*) that are operable independently. That is, two belts are disposed adjacent to and parallel to each other.

As a result, it is possible to adjust the posture of the target object by three degrees of freedom by using the robot hand having the configuration of two degrees of freedom.

In addition, the robot hand (for example, robot hand 40) has two finger portions (for example, finger portions 42*a* and 42*b*), one finger portion (for example, finger portion 42*a*) of two finger portions has one belt (for example, belt 43*a*), and the other finger portion (for example, finger portion 42*b*) of two finger portions has two parallel running belts (for example, belts 43*b* and 43*c*) that are operable independently.

As a result, it is possible to adjust the posture of the target object by three degrees of freedom by using the robot hand having the configuration of two degrees of freedom.

In addition, the robot hand (for example, robot hand 50 or 60) has three finger portions (for example, finger portions 52*a* to 52*c* or finger portions 62*a* to 62*c*).

As a result, it is possible to adjust the posture of the target object by three degrees of freedom by using the robot hand having the configuration of two degrees of freedom.

In addition, the first axis (for example, X-axis) and the second axis (for example, Y-axis) are orthogonal to each other.

As a result, it is possible to adjust the posture of the target object by three degrees of freedom by using the robot hand having the configuration of two degrees of freedom in a case where two axes capable of rotating the target object are orthogonal to each other.

In addition, the first axis (for example, axis A) and the second axis (for example, axis B) are not orthogonal to each other.

As a result, it is possible to adjust the posture of the target object by three degrees of freedom by using the robot hand having the configuration of two degrees of freedom in a case where the two axes capable of rotating the target object are not orthogonal to each other.

In addition, the robot hand includes an opening and closing unit (for example, hand opening and closing motor 15) for opening or closing each of the plurality of finger portions.

As a result, the plurality of finger portions are individually opened and closed, and thus, it is possible to grip the target object at an appropriate position and posture.

OTHER EXEMPLARY EMBODIMENTS

In the above exemplary embodiment, two or three finger portions of the robot hand are illustrated, but the present disclosure is not limited thereto. Other configurations may be adopted as long as the plurality of belts described above can be controlled regardless of the number of finger portions. For example, the above control can be realized by setting a total number of belts that are operable independently to at least three and obtaining the configuration in which the target object is rotatable about two different axes. Here, two axes on which the target object is rotatable may be orthogonal to each other as in the configuration example of the robot hand illustrated in FIGS. 3, 8, and 10, or may not be orthogonal to each other as in the configuration example of the robot hand illustrated in FIG. 14. In addition, the numbers of belts and belt motors provided for one finger portion are not limited to the above examples. For example, in the configuration of FIG. 3, two parallel running belts with respect to one finger portion, but two belts may be linearly arranged.

In addition, the shape of the target object that can be gripped by the robot hand is not limited to a rectangular shape such as a ball or dice, and may be configured to grip a target object having another shape. In addition, in the above example, the target object is gripped from an upper side in the Z-axis direction. However, the target object can be similarly controlled even in a case where the target object is gripped from the X-axis direction or the Y-axis direction. In this case, the axis (the third axis) that cannot be directly rotated is changed.

In addition, another possible implementation includes processing in which a program and an application for implementing the functions according to the one or more exemplary embodiments described above are supplied to a system or an apparatus, by using a network, a storage medium, or the like, and one or more processors in a computer included in the system or the apparatus are caused to read and execute the program and the application.

In addition, the exemplary embodiment may be implemented as a circuit (for example, an application specific integrated circuit (ASIC) or a field programmable gate array (FPGA)) that implements one or more functions.

Although various exemplary embodiments have been described above with reference to the drawings, it goes without saying that the present disclosure is not limited to such examples. It is obvious that those skilled in the art can arrive at various modification examples, modification examples, replacement examples, additional examples, deletion examples, and equivalent examples within the scope described in the claims, and it is understood that these examples naturally belong to the technical scope of the present disclosure. In addition, the elements included in the various exemplary embodiments described above may be voluntarily combined, within the scope not departing from the gist of the invention.

INDUSTRIAL APPLICABILITY

The present disclosure is useful as a robot system including a robot hand, a device for controlling a robot hand, and a method for controlling a robot hand.

REFERENCE MARKS IN THE DRAWINGS

1 robot
10, 40, 50, 60 robot hand
11, 41, 51, 61 coupling portion
12, 42, 52, 62 finger portion
13, 43, 53, 63 belt
14, 44, 54, 64 belt motor
15 hand opening and closing motor
20 robot arm
30 base
100 control system
101 processor
102 memory
103 robot arm connection unit
104 input device
105 robot hand connection unit
106 communication device
107 input and output interface
110 network

The invention claimed is:

1. A robot system comprising:

a robot hand that includes finger portions, belts on the finger portions, and a motor for driving the belts; and a control device configured to control the robot hand, wherein:

the robot hand is configured to rotate a target object about a first axis on a three-dimensional coordinate axis and a second axis which is different from the first axis by driving the belts in a state of gripping the target object;

the robot hand is configured such that, in the state of gripping the target object, the target object is not directly rotatable about a third axis which is orthogonal to each of the first axis and the second axis; and the control device is configured to:

convert, when causing the target object gripped by the robot hand to transition to a target posture rotated about the third axis, a rotation target angle about the third axis into a sequence of rotation amounts about axes about which the robot hand is capable of rotating the target object in the state of gripping the target object, the sequence of rotation amounts including at least a rotation amount about the first axis and a rotation amount about the second axis; and control the belts based on the sequence of rotation amounts to transition the target object to the target posture while maintaining the state of gripping the target object.

2. The robot system according to claim 1, wherein, the target object is caused to transition to the target posture rotated about the third axis by a rotation target angle $\alpha$, and the control device is configured to cause the target object to transition to the target posture by rotating the target object about the first axis by $\pi/2$, rotating the target object about the second axis by $-\alpha$, and rotating the target object about the first axis by $-\pi/2$.

3. The robot system according to claim 1, wherein, the target object is caused to transition to the target posture rotated about the third axis by a rotation target angle $\alpha$, and the control device is configured to cause the target object to transition to the target posture by rotating the target object about the first axis by $-\pi/2$, rotating the target object about the second axis by $\alpha$, and rotating the target object about the first axis by $\pi/2$.

4. The robot system according to claim 1, wherein:

the belts are operable independently of each other; and a total number of the belts is at least three.

5. The robot system according to claim 4, wherein:

the finger portions include two finger portions; and the belts include two parallel belts on each of the two finger portions and operable independently of each other.

6. The robot system according to claim 4, wherein:

the finger portions include a first finger portion and a second finger portion;

the belts include:

a first belt and a second belt on the first finger portion and operable independently of each other; and a third belt and a fourth belt on the second finger portion and operable independently of each other, and the control device is configured to:

rotate the target object about the first axis by driving the first belt and the second belt in a first direction parallel to the third axis and driving the third belt and the fourth belt in a second direction which is opposite to the first direction; and rotate the target object about the second axis by driving the second belt and the fourth belt in the first direction and driving the first belt and the third belt in the second direction.

7. The robot system according to claim 4, wherein:

the finger portions include two finger portions; and the belts include:

one belt on a first finger portion of the two finger portions; and two parallel belts on a second finger portion of the two finger portions and operable independently of each other.

8. The robot system according to claim 4, wherein the finger portions include three finger portions.

9. The robot system according to claim 1, wherein the first axis and the second axis are orthogonal to each other.

10. The robot system according to claim 1, wherein the first axis and the second axis are not orthogonal.

11. The robot system according to claim 1, wherein the robot hand further includes an actuator for opening or closing each of the finger portions.

12. The robot system according to claim 1, wherein the sequence of rotation amounts further includes another rotation amount about the first axis.

13. A control device for controlling a robot hand that includes finger portions, belts on the finger portions, and a motor for driving the belts, the control device comprising:

a processor; and a memory, wherein:

the robot hand is configured to rotate a target object about a first axis on a three-dimensional coordinate axis and a second axis which is different from the first axis by driving the plurality of belts in a state of gripping the target object; and the robot hand is configured such that, in the state of gripping the target object, the target object is not directly rotatable about a third axis which is orthogonal to each of the first axis and the second axis;

the memory has stored thereon executable instructions that, when executed by the processor, cause the control device to:

convert, when causing the target object gripped by the robot hand to transition to a target posture rotated about the third axis, a rotation target angle about the third axis into a sequence of rotation amounts about axes about which the robot hand is capable of rotating the target object in the state of gripping the target object, the sequence of rotation amounts including at least a rotation amount about the first axis and a rotation amount about the second axis; and control the belts based on the sequence of rotation amounts to transition the target object to the target posture while maintaining the state of gripping the target object.

14. The control device according to claim 13, wherein the sequence of rotation amounts further includes another rotation amount about the first axis.

15. A method for controlling a robot hand that includes finger portions, belts on the finger portions, and a motor for driving the belts, the method comprising:

rotating, by the robot hand, a target object about a first axis on a three-dimensional coordinate axis and a second axis which is different from the first axis by driving the belts in a state of gripping the target object, wherein the robot hand is configured such that, in the state of gripping the target object, the target object is not directly rotatable about a third axis which is orthogonal to each of the first axis and the second axis;

converting, by a control device, when causing the target object gripped by the robot hand to transition to a target posture rotated about the third axis, a rotation target angle about the third axis into a sequence of rotation amounts about axes about which the robot hand is capable of rotating the target object in the state of gripping the target object, the sequence of rotation amounts including at least a rotation amount about the first axis and a rotation amount about the second axis; and controlling, by the control device, the belts based on the sequence of rotation amounts to transition the target object to the target posture while maintaining the state of gripping the target object.

16. The method according to claim 15, wherein the sequence of rotation amounts further includes another amount about the first axis.

* * * * *